United States Patent
Wang et al.

(10) Patent No.: US 11,971,821 B2
(45) Date of Patent: Apr. 30, 2024

(54) COMPUTING SYSTEM WITH WRITE-BACK AND INVALIDATION IN A HIERARCHICAL CACHE STRUCTURE BASED ON AT LEAST ONE DESIGNATED KEY IDENTIFICATION CODE

(71) Applicant: Shanghai Zhaoxin Semiconductor Co., Ltd., Shanghai (CN)

(72) Inventors: Weilin Wang, Beijing (CN); Yingbing Guan, Shanghai (CN); Lei Yi, Xi'an (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 18/046,618

(22) Filed: Oct. 14, 2022

(65) Prior Publication Data
US 2023/0161703 A1    May 25, 2023

(30) Foreign Application Priority Data
Nov. 19, 2021   (CN) .......................... 202111374239.1

(51) Int. Cl.
*G06F 12/00* (2006.01)
*G06F 12/0811* (2016.01)
(Continued)

(52) U.S. Cl.
CPC ...... *G06F 12/0811* (2013.01); *G06F 12/0831* (2013.01); *G06F 12/0891* (2013.01)

(58) Field of Classification Search
CPC ............ G06F 12/0811; G06F 12/0831; G06F 12/0891; G06F 12/0238
See application file for complete search history.

(56) References Cited

U.S. PATENT DOCUMENTS 10,977,192 B1    4/2021   Habusha
2002/0069328 A1   6/2002   Chauvel
(Continued)

OTHER PUBLICATIONS

Notice of Allowance dated Nov. 7, 2023, issued in U.S. Appl. No. 18/046,634.
(Continued)

*Primary Examiner* — Arvind Talukdar
(74) *Attorney, Agent, or Firm* — McClure, Qualey & Rodack, LLP

(57) ABSTRACT

A computing system with a first instruction of an instruction set architecture (ISA) for write-back and invalidation in a hierarchical cache structure based on one single designated key identification code, and a second instruction of ISA for write-back and invalidation in the hierarchical cache structure based on a plurality of designated key identification codes is shown. A decoder transforms the first or second instruction into at least one microinstruction. Based on the at least one microinstruction, one write-back and invalidation request is provided corresponding to each designated key identification code, to be passed to the hierarchical cache structure through a memory ordering buffer. For each write-back and invalidation request, the cache line write-back and invalidation regarding a designated key identification code is performed on a last-level cache first, and then is performed on the in-core cache modules.

36 Claims, 11 Drawing Sheets

(51) Int. Cl.
*G06F 12/0831* (2016.01)
*G06F 12/0891* (2016.01)

(56) References Cited

U.S. PATENT DOCUMENTS

| | | |
|---|---|---|
| 2005/0027964 A1 | 2/2005 | Sperber |
| 2011/0238947 A1 | 9/2011 | Nishiguchi |
| 2013/0339657 A1 | 12/2013 | Greiner |
| 2014/0181388 A1 | 6/2014 | Mohandru |
| 2015/0242319 A1 | 8/2015 | Evans |
| 2017/0262369 A1 | 9/2017 | Murphy |
| 2018/0329829 A1 | 11/2018 | Zmudzinski |
| 2020/0057664 A1 | 2/2020 | Durham |
| 2020/0202012 A1* | 6/2020 | Shanbhogue ....... G06F 12/0804 |
| 2020/0409844 A1 | 12/2020 | Sanjeepan |
| 2021/0406195 A1 | 12/2021 | Vakharwala |
| 2022/0066947 A1 | 3/2022 | Pape |
| 2023/0161704 A1 | 5/2023 | Wang |

OTHER PUBLICATIONS

Cloutier, F.; "INVD—Invalidate Internal Caches;" Mar. 2023; pp. 1-2 https://web.archive.org/web/20190812221944/https://www.felixcloutier.com/x86/invd.

* cited by examiner

COMPUTING SYSTEM WITH WRITE-BACK AND INVALIDATION IN A HIERARCHICAL CACHE STRUCTURE BASED ON AT LEAST ONE DESIGNATED KEY IDENTIFICATION CODE

This application claims priority of China Patent Application No. 202111374239.1, filed on Nov. 19, 2021, the entirety of which is incorporated by reference herein.

BACKGROUND

Technical Field

The present application relates to a management technology for a hierarchical cache structure of a computing system.

Description of the Related Art

In a computing system, memory devices may be classified into tiers. The higher-level memory has higher speed, lower latency, but lower capacity. The memory hierarchy of most computing systems has the following four levels (ordered from top to bottom): registers; caches; a system memory (a main memory, such as a DRAM); and disks (SSD or HD).

In particular, caches may also be arranged in a hierarchical design. From the high-access speed to the low-access speed, the caches include: the level 1 cache L1; the level 2 cache L2; and the level 3 cache L3 (also known as the last level cache, LLC for short). The management of the hierarchical cache structure will significantly affect system performance.

In order to protect confidential and sensitive data, a total memory encryption technology is developed to use different keys to encrypt associated parts of the system memory, wherein the management of the system memory depends on the keys (in granularity of keys). The management with granularity of keys, however, is not applied to the hierarchical cache structure, so an operating system (OS) is incapable of managing the hierarchical cache structure in granularity of keys.

BRIEF SUMMARY

In order to solve the above-mentioned problems, this case proposes a management technology that manages a hierarchical cache structure in granularity of keys. Such a technology may be implemented within a computing system. A method for operating a computing system by such a technology is also introduced.

A computing system in accordance with an exemplary embodiment of the present application has: a first core provided by a first processor that is fabricated on a first die, including a decoder, a memory ordering buffer, and a first in-core cache module; and a first last-level cache, fabricated in the first processor. In response to a first instruction of an instruction set architecture that is provided for write-back and invalidation in a hierarchical cache structure based on one single designated key identification code, the decoder outputs at least one microinstruction. Based on the at least one microinstruction, a write-back and invalidation request is provided to the first in-core cache module through the memory ordering buffer, and then passed to the first last-level cache by the first in-core cache module. In response to the write-back and invalidation request, the first last-level cache searches itself to determine which cache lines within the first last-level cache match the designated key identification code; wherein: if a matched cache line has been modified and does not exist in any upper-level cache, the first last-level cache writes back the matched cache line to a system memory; and, whether modified or not, all matched cache lines within the first last-level cache are invalidated.

In an exemplary embodiment, a synchronization design is shown, which is described below.

In an exemplary embodiment, after providing the first last-level cache with the write-back and invalidation request, the first in-core cache module is switched to a waiting state for synchronization. After all matched cache lines within the first last-level cache are invalidated, the first last-level cache returns a first synchronization signal to the first in-core cache module. The first in-core cache module in the waiting state is awakened by the first synchronization signal returned from the first last-level cache, to search itself to determine which cache lines within the first in-core cache module match the designated key identification code, wherein: if a matched cache line has been modified, the first in-core cache module writes back the matched cache line to the system memory; and, whether modified or not, all matched cache lines within the first in-core cache module are invalidated.

The present application further teaches the write-back and invalidation in a hierarchical cache structure based on a plurality of designated key identification codes.

In an exemplary embodiment, in response to a second instruction of an instruction set architecture that is provided for write-back and invalidation in a hierarchical cache structure based on a plurality of designated key identification codes, the decoder outputs at least one microinstruction. Based on the microinstruction decoded from the second instruction, the designated key identification codes are stored in a storage unit of the first core, and a plurality of write-back and invalidation requests corresponding to the different designated key identification codes read from the storage unit are provided to the first in-core cache module through the memory ordering buffer. Write-back and invalidation in the hierarchical cache structure based on the next designated key identification code is performed after write-back and invalidation in the hierarchical cache structure based on the current designated key identification code is finished.

According to the technology of the present application, a hierarchical cache structure with a management technology in granularity of keys is proposed. When the total memory encryption is on, the operating system manages the hierarchical cache structure in granularity of keys.

A detailed description is given in the following embodiments with reference to the accompanying drawings.

BRIEF DESCRIPTION OF THE DRAWINGS

The present application can be more fully understood by reading the subsequent detailed description and examples with references made to the accompanying drawings, wherein.

DETAILED DESCRIPTION

Figure 1A:
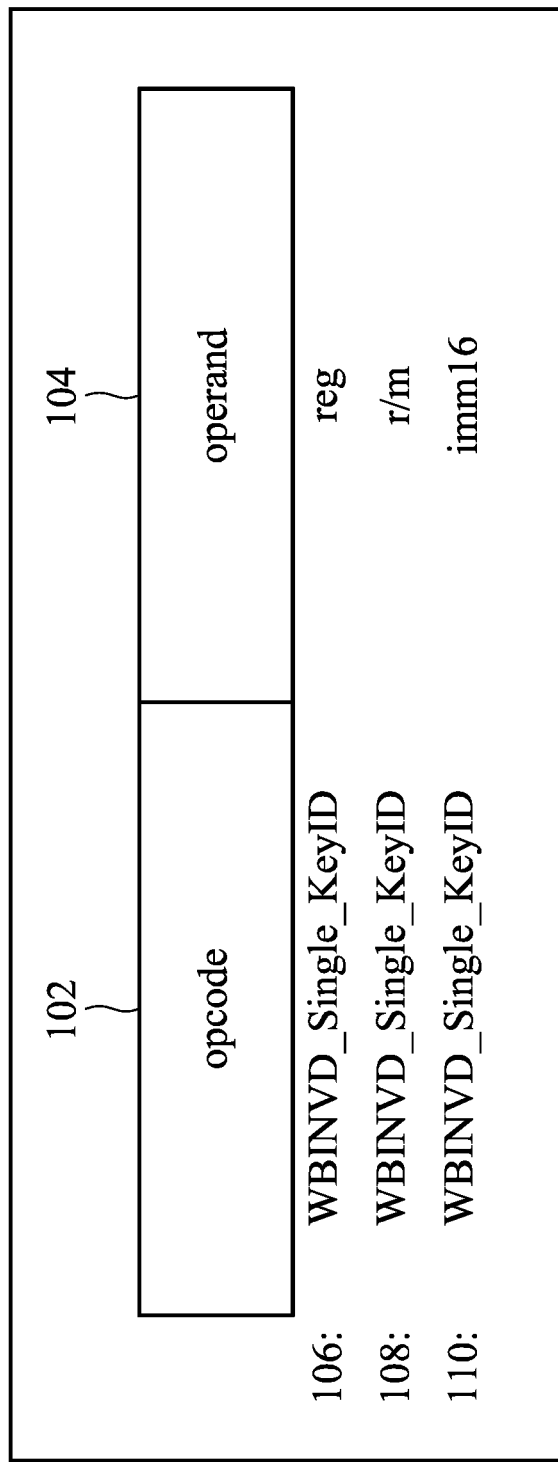
FIG. 1A shows several instruction formats for the ISA invalidation instruction WBINVD_Single_KeyID in accordance with an exemplary embodiment of the present application.

The following description is made for the purpose of illustrating the general principles of the invention and should not be taken in a limiting sense. The scope of the invention is best determined by reference to the appended claims.

At present, a computing system usually has a total memory encryption design, which uses different keys to encrypt the different parts of a system memory to increase the security of the computing system. The keys for the encryption of the different storage areas of the system memory each may be represented by a particular key identification code (key ID). The computing system may use a key table to store the keys of the different key IDs. During data encryption, the key table is checked to obtain the key corresponding to the entered key ID.

Considering the multi-key encryption of the system memory, in the present application, the key ID is one of the parameters used in the management of a hierarchical cache structure. The hierarchical cache structure may include level 1 (L1), level 2 (L2) and level 3 caches (L3). In this way, the hierarchical cache structure is also managed based on the full-memory encryption technology.

Two functions to manage a hierarchical cache structure are discussed here, one is a write-back and invalidation (WBINVD) function, and another is a direct invalidation (INVD, invalidation without writing back) function. Conventionally, the two functions are performed on all cache lines of the hierarchical cache structure. In the present application, these two functions may be applied to only the cache lines corresponding to a designated key ID, or corresponding to a plurality designated key IDs. In the following paragraphs, two write-back and invalidation instructions WBINVD_Single_KeyID and WBINVD_Multiple_KeyIDs are introduced later to write back and then invalidate the cache line(s) with the designated key ID(s), and two direct invalidation instructions INVD_Single_KeyID and INVD_Multiple_KeyIDs are introduced to perform invalidation, without writing back, on the cache line(s) with the designated key ID(s). In this way, the operating system (abbreviated OS) may manage the hierarchical cache structure in granularity of keys. Because the cache lines not related to the designated key IDs are still kept in the hierarchical cache structure to quickly respond to the access need, the computing system performance is significantly improved.

In the present application, a variety of computing system is shown, including a single core processor, a multi-core processor, a system with multiple processors, and so on.

The proposed processor may provide each of the aforementioned functions (e.g., a function for write-back and invalidation in a hierarchical cache structure based on one single designated key ID, a function for write-back and invalidation in a hierarchical cache structure based on a plurality of designated key IDs, a function for direct invalidation, without writing back, in a hierarchical cache structure based on one single designated key ID, and a function for direct invalidation, without writing back, in a hierarchical cache structure based on a plurality of designated key IDs) with one instruction set architecture (ISA) instruction. The processor may be designed according to an x86 instruction set architecture, an MIPS (Microprocessor without Interlocked Pipeline Stages) instruction set architecture, a RISC-V (RISC-Five) instruction set architecture, an SPARC instruction set architecture, an IBM Power instruction set architecture, or others.

In an exemplary embodiment, the present application proposes a processor that provides an ISA invalidation instruction (hereinafter referred to as WBINVD_Single_KeyID) to invalidate cache lines in a hierarchical cache structure based on one single designated key ID (Key_ID_S). Note that the matched cache lines with the status M (modified, or updated) are first written back to the system memory before being invalidated. This behavior is called write-back and invalidation in the hierarchical cache structure based on one single designated key ID (Key_ID_S).

FIG. 1A shows several instruction formats for the ISA invalidation instruction WBINVD_Single_KeyID in accordance with an exemplary embodiment of the present application. In addition to the opcode 102 for recognizing the instruction, the ISA invalidation instruction WBINVD_Single_KeyID further includes an operand 104. Through the operand 104, one designated key ID (Key_ID_S) is obtained. The operand 104 may be implemented in various ways. Referring to the instruction format 106, corresponding to the ISA invalidation instruction WBINVD_Single_KeyID, a register number (reg) is used as the operand 104 to indicate a register; and the designated key ID (Key_ID_S) is obtained from the indicated register. Referring to the instruction format 108, corresponding to the ISA invalidation instruction WBINVD_Single_KeyID, a register number or a system memory address (r/m) is used as the operand 104 to indicate a register or a memory space; and the designated key ID (Key_ID_S) is obtained from the indicated register or the indicated memory space. Referring to the instruction format 110, corresponding to the ISA invalidation instruction WBINVD_Single_KeyID, an immediate value (imm16) is used as the operand 104; and the immediate value (imm16) represents the designated key ID (Key_ID_S). In the program coding, prior to the ISA invalidation instruction WBINVD_Single_KeyID, other instructions are required to program a register or a system memory, or to enter an immediate value to prepare the designated key ID (Key_ID_S) that is used as the operand 104 required in the ISA invalidation instruction WBINVD_Single_KeyID. In some exemplary embodiments, some instructions for mode setting (e.g., setting a real mode, a protection mode, a 64-bit mode, etc.) are coded prior to the ISA invalidation instruction WBINVD_Single_KeyID. In some exemplary embodiments, some instructions for setting the bit length of the designated key ID (Key_ID_S) are coded prior to the ISA invalidation instruction WBINVD_Single_KeyID.

In an exemplary embodiment, some high bits of a physical address (PA) form a key identification code (Key_ID). The cache line information of each cache line in the hierarchical cache structure may include the key identification code (Key_ID) as shown in FIG. 2B. If a cache line has a key identification code (Key_ID) the same as the designated key ID (Key_ID_S) indicated by the ISA invalidation instruction WBINVD_Single_KeyID, it means that the cache line matches the designated key ID (Key_ID_S). In another exemplary embodiment, the key identification code (Key_ID) is converted from the high bits of the physical address (PA) rather than being directly represented by the high bits of the physical address (PA). Such a key identification code is still stored in a cache line, and may be compared with the designated key ID (Key_ID_S) for matching determination. The matching determination of the present application is based on comparing the cached key identification code (Key_ID) with the designated key ID (Key_ID_S).

In another exemplary embodiment, the proposed processor operates according to an instruction set architecture (ISA) invalidation instruction WBINVD_Multiple_KeyIDs. In a hierarchical cache structure, in response to the ISA invalidation instruction WBINVD_Multiple_KeyIDs, the cache lines matching a plurality of designated key IDs (Key_ID_S1 . . . Key_ID_SN) indicated by the ISA invalidation instruction WBINVD_Multiple_KeyIDs are all invalidated by the processor. Especially, the matched cache lines with "M" state (modified, or updated state) need to be written to the system memory before being invalidated. This behavior is called write-back and invalidation of cache lines matching a plurality of designated key IDs Key_ID_S1 . . . Key_ID_SN.

Figure 1B:
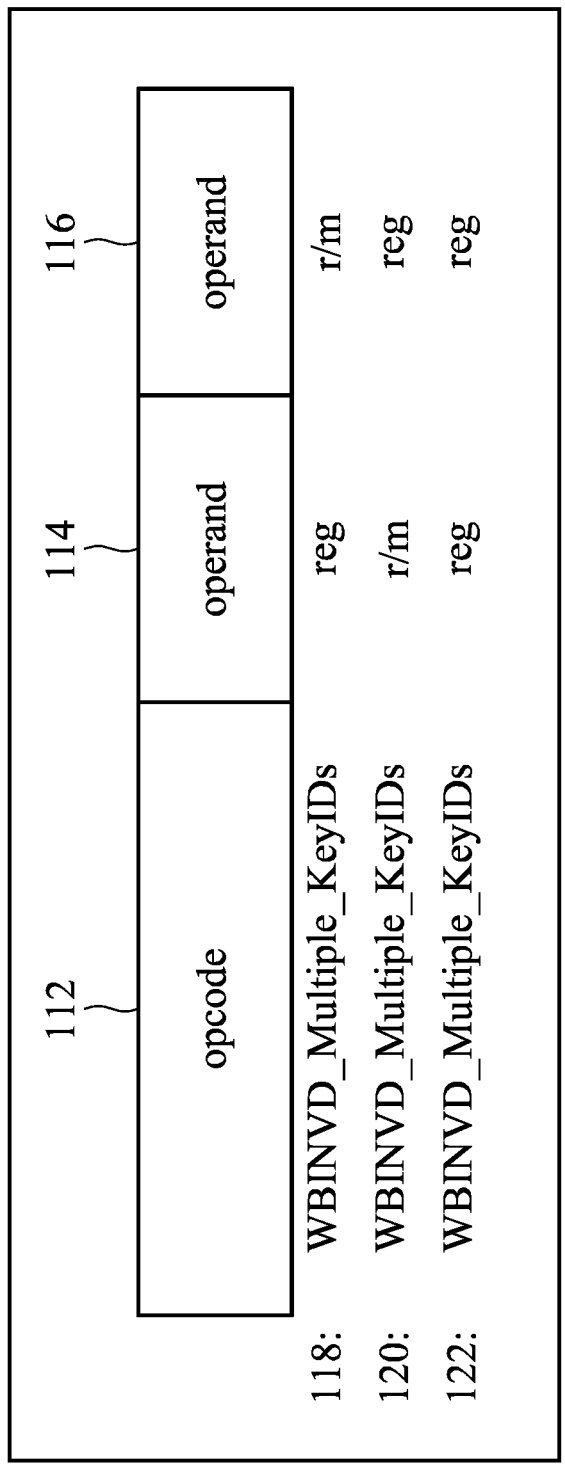
FIG. 1B shows several instruction formats of the ISA invalidation instruction WBINVD_Multiple_KeyIDs in accordance with an exemplary embodiment of the present application.

FIG. 1B shows several instruction formats of the ISA invalidation instruction WBINVD_Multiple_KeyIDs in accordance with an exemplary embodiment of the present application. In addition to the opcode 112 for recognizing the instruction, two operands 114 and 116 are required to designate a plurality of designated key IDs Key_ID_S1 . . . Key_ID_SN. Referring to the instruction format 118 for the ISA invalidation instruction WBINVD_Multiple_KeyIDs, a register number (reg) is used as the operand 114, and another register number or a system memory address (r/m) is used as the operand 116. A value read from a register indicated by the register number obtained from the operand 114 and a value read from a register or a system memory as indicated by the register number or the system memory address obtained from the operand 116 are combined to designate a plurality of designated key IDs Key_ID_S1 . . . Key_ID_SN. Referring to the instruction format 120 for the ISA invalidation instruction WBINVD_Multiple_KeyIDs, a register number or a system memory address (r/m) is used as the operand 114, and another register number (reg) is used as the operand 116. A value read from a register or a system memory as indicated by the register number or the system memory address obtained from the operand 114 and a value read from a register indicated by the register number obtained from the operand 116 are combined to designate the designated key IDs Key_ID_S1 . . . Key_ID_SN. Referring to the instruction format 122 for the ISA invalidation instruction WBINVD_Multiple_KeyIDs, the operands 114 and 116 each carry a register number. Two values read from two registers indicated by the operands 114 and 116 are combined to designate the designated key IDs Key_ID_S1 . . . Key_ID_SN. In some exemplary embodiments, some instructions programming the registers or the system memory to designate the designated key IDs Key_ID_S1 . . . Key_ID_SN are coded prior to the ISA invalidation instruction WBINVD_Multiple_KeyIDs. The ISA invalidation instruction WBINVD_Multiple_KeyIDs is executed according to the designated key IDs Key_ID_S1 . . . Key_ID_SN obtained through these operands 114 and 116.

In an exemplary embodiment, an initial key ID Key_ID_initial is set via the operand 114, a mask is set via the operand 116. A plurality of designated key IDs (Key_ID_S1 . . . Key_ID_SN) are derived by using the mask and the initial key ID Key_ID_initial.

In an exemplary embodiment, a "0" bit in the mask will make the corresponding bit in the initial key ID Key_ID_initial to be "1" or "0", and a "1" bit in the mask will make the corresponding bit of the key ID Key_ID_initial unchanged. The initial key ID Key_ID_initial is derived into a plurality of designated key IDs Key_ID_S1 . . . Key_ID_SN by the "0" bit(s) in the mask. In practical applications, to get designated key IDs Key_ID_S1 . . . Key_ID_SN with specified bits at specified values, the specific bits in the initial key ID Key_ID_initial are set to the specific values, and the specific bits in the mask are all set to "1" (while the remaining bits in the mask are set to "0"). For example, if the initial key ID Key_ID_initial is "101 . . . 010" and the mask is "111 . . . 011", the masked results are "101 . . . 010" and "101 . . . 110", which are two designated key IDs. If the initial key ID Key_ID_initial is "101 . . . 010" and the mask is "111 . . . 100", the masked results are "101 . . . 000", "101 . . . 001", "101 . . . 010" and "101 . . . 011", which are four designated key IDs.

In another exemplary embodiment, an XOR calculation is performed on the initial key ID Key_ID_initial and the mask bit by bit. A "0" bit in the XOR result will make the corresponding bit in the initial key ID Key_ID_initial to be "1" or "0", and a "1" bit in the XOR result will make the corresponding bit of the key ID Key_ID_initial unchanged. The single initial key ID Key_ID_initial, therefore, is derived into a plurality of designated key IDs Key_ID_S1 . . . Key_ID_SN. In practical applications, to have the designated key IDs Key_ID_S1 . . . Key_ID_SN with specified bits at specified values, the specified bits in the initial key ID Key_ID_initial are set to the specific values, and the specified bits in the initial key ID Key_ID_initial are inverted and used as the specified bits of the mask. As for the remaining bits, they are the same in the initial key ID Key_ID_initial and in the mask. For example, if the initial key ID Key_ID_initial is "101 . . . 010" and the mask is "010 . . . 110", the XOR result is "111 . . . 100", and the masked results are "101 . . . 000", "101 . . . 001", "101 . . . 010", and "101 . . . 011", which are four consecutive key IDs.

In an exemplary embodiment, a starting designated key ID (Key_ID_first) is set via the operand 114, and a designated number of key IDs (num_of_KeyIDs) is set via the operand 116. A plurality of key IDs (Key_IDs) may be recorded in a list in the system memory, and these key IDs (Key_IDs) may be either continuous or discontinuous numbers. The operand 114 may be a system memory address of the starting designated key ID (Key_ID_first), pointing to the position of the starting designated key ID (Key_ID_first) on the list. According to the designated number of key IDs (num_of_KeyIDs) obtained from the operand 116, a plurality of designated key IDs (Key_ID_S1 . . . Key_ID_SN) starting from the starting designated key ID (Key_ID_first) may be read from the list.

In an exemplary embodiment, regarding the write-back and invalidation in a hierarchical cache structure based on a plurality of designated key IDs (Key_ID_S1 . . . Key_ID_SN), the processor introduces two ISA invalidation instructions: WBINVD_Multiple_KeyIDs_1 with the mask technique; and WBINVD_Multiple_KeyIDs_2 with the list looking-up technique.

In another exemplary embodiment, a processor with an instruction set architecture (ISA) invalidation instruction INVD_Single_KeyID is proposed. In a hierarchical cache structure, in response to the ISA invalidation instruction INVD_Single_KeyID, the cache lines matching one designated key ID (Key_ID_S) indicated by the ISA invalidation instruction INVD_Single_KeyID are invalidated by the processor, without being written back to the system memory. The data coherence is not necessary.

Figure 1C:
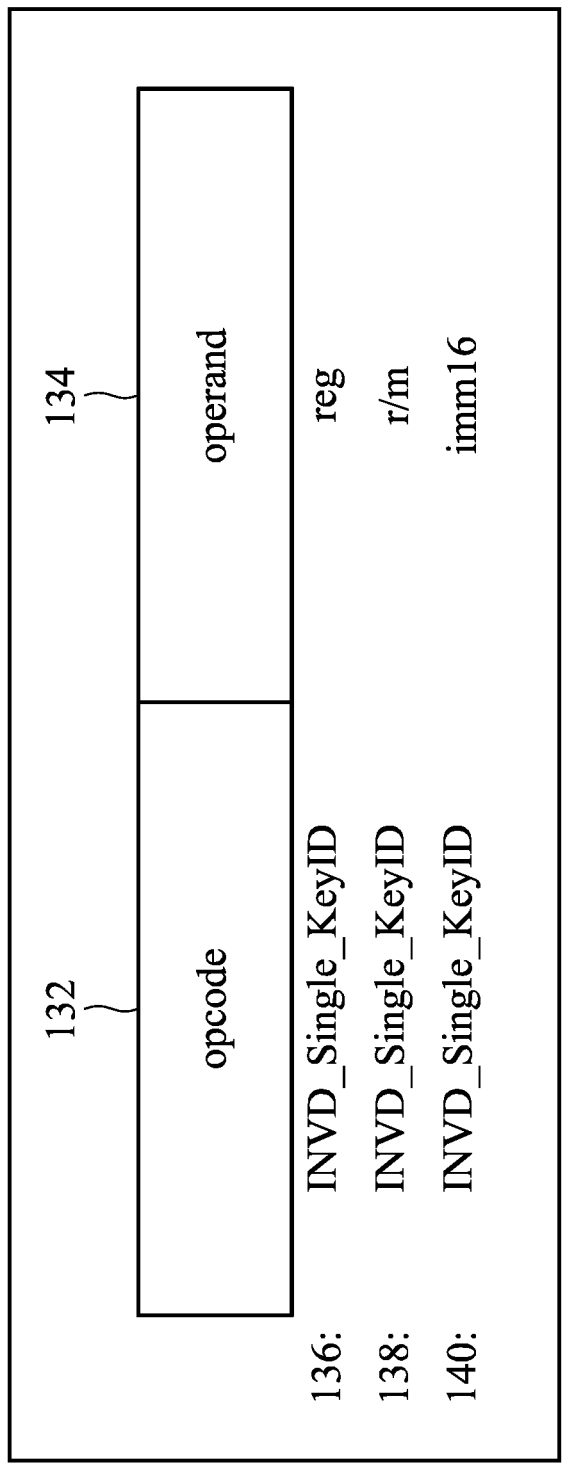
FIG. 1C shows the instruction formats of the ISA invalidation instruction INVD_Single_KeyID in accordance with exemplary embodiments of the present application.

FIG. 1C shows the instruction formats of the ISA invalidation instruction INVD_Single_KeyID in accordance with exemplary embodiments of the present application. In addition to the opcode 132 for instruction recognition, the ISA invalidation instruction INVD_Single_KeyID uses a single operand 134 to enter a designated key ID (Key_ID_S). There are various ways to set the operand 134. The instruction format 136 shows that, corresponding to the ISA invalidation instruction INVD_Single_KeyID, a register number (reg) is entered as the operand 134. The designated key ID (Key_ID_S) is read from the register indicated by the register number (reg). The instruction format 138 shows that, corresponding to the ISA invalidation instruction INVD_Single_KeyID, a register number or a system memory address (r/m) is entered as the operand 134. The designated key ID (Key_ID_S) is read from a register indicated by the register number, or a system memory according to the system memory address. The instruction structure 140 shows that, corresponding to the ISA invalidation instruction INVD_Single_KeyID, an immediate value (imm16) is used as the operand 134, which is the designated key ID (Key_ID_S). Some instructions programming the register/system memory or setting the immediate value are coded prior to the ISA invalidation instruction INVD_Single_KeyID, to enter the designated key ID Key_ID_S. The ISA invalidation instruction INVD_Single_KeyID is executed according to the designated key ID Key_ID_S obtained through the operand 134. In some exemplary embodiments, some instructions for mode setting (e.g., setting a real mode, a protection mode, a 64-bit mode, etc.) are coded prior to the ISA invalidation instruction INVD_Single_KeyID. In some exemplary embodiments, some instructions for setting the bit length of the designated key ID (Key_ID_S) are coded prior to the ISA invalidation instruction INVD_Single_KeyID.

In another exemplary embodiment, a processor with an instruction set architecture (ISA) invalidation instruction INVD_Multiple_KeyIDs is proposed. In a hierarchical cache structure, in response to the ISA invalidation instruction INVD_Multiple_KeyIDs, the cache lines matching the designated key IDs (Key_ID_S1 . . . Key_ID_SN) indicated by the ISA invalidation instruction INVD_Multiple_KeyIDs are invalidated by the processor, without being written back to the system memory. The data coherence is not necessary.

Figure 1D:
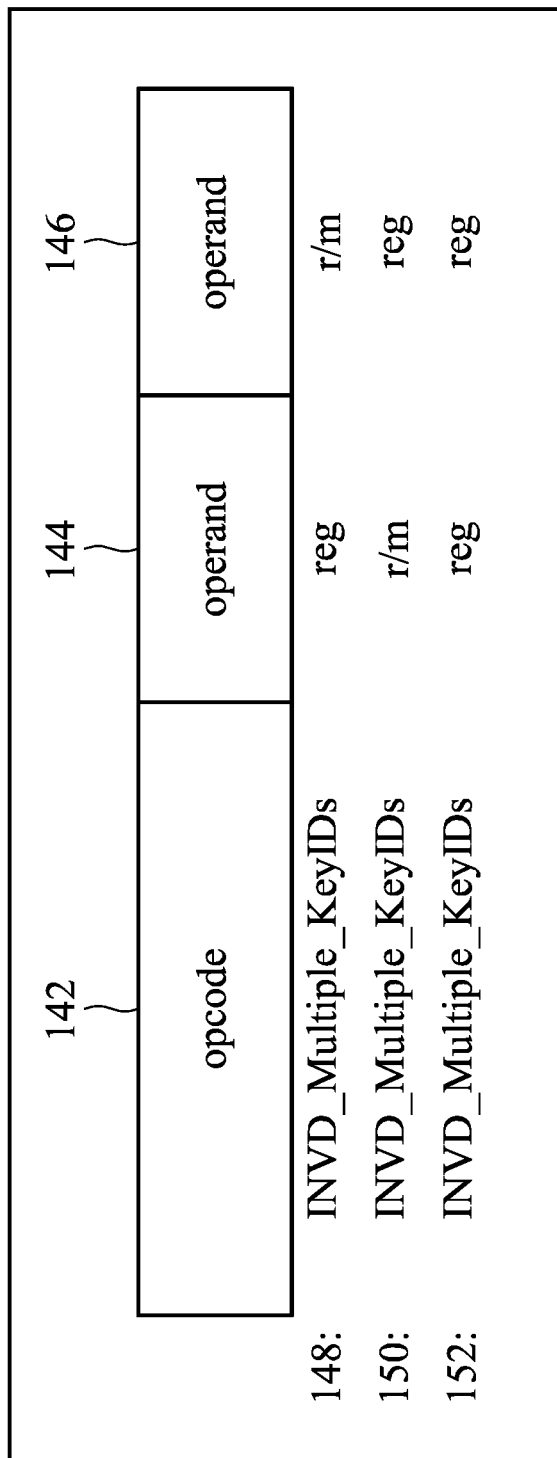
FIG. 1D shows the instruction formats of the ISA invalidation instruction INVD_Multiple_KeyIDs in accordance with exemplary embodiments of the present application.

FIG. 1D shows the instruction formats of the ISA invalidation instruction INVD_Multiple_KeyIDs in accordance with exemplary embodiments of the present application. In addition to the opcode 142 for instruction recognition, the ISA invalidation instruction INVD_Multiple_KeyIDs uses two operands 144 and 146 to designate a plurality of designated key IDs Key_ID_S1 . . . Key_ID_SN. The instruction format 148 shows that, corresponding to the ISA invalidation instruction INVD_Multiple_KeyIDs, a register number is entered as the operand 144, and a register number or a system memory address (r/m) is entered as the operand 146. Two values read from two registers (or from one register and the system memory) are combined to form a plurality of designated key IDs Key_ID_S1 . . . Key_ID_SN. The instruction format 150 shows that, corresponding to the ISA invalidation instruction INVD_Multiple_KeyIDs, a register number or a system memory address (r/m) is entered as the operand 144, and a register number (reg) is entered as the operand 146. Two values read from two registers (or form one register and the system memory) are combined to form the designated key IDs Key_ID_S1 . . . Key_ID_SN. The instruction format 152 shows that, corresponding to the ISA invalidation instruction INVD_Multiple_KeyIDs, the operands 144 and 146 each represent a register number (reg). Accordingly, two values are read from the registers to form the designated key IDs Key_ID_S1 . . . Key_ID_SN. Some instructions programming the registers or the system memory to designate the designated key IDs Key_ID_S1 . . . Key_ID_SN are coded prior to the ISA invalidation instruction INVD_Multiple_KeyIDs. The ISA invalidation instruction INVD_Multiple_KeyIDs is executed according to the designated key IDs Key_ID_S1 . . . Key_ID_SN obtained through the operands 144 and 146.

In an exemplary embodiment, an initial key ID Key_ID_initial is set via the operand 144, and a mask is set via the operand 146. The forgoing mask technique is used here.

In an exemplary embodiment, a starting designated key ID (Key_ID_first) is set via the operand 144, and a designated number of key IDs (num_of_KeyIDs) is set via the operand 146. The forgoing list looking-up technique is used here.

In an exemplary embodiment, regarding the invalidation, without writing the matched cache lines back to the system memory, of cache lines matching a plurality of designated key IDs (Key_ID_S1 . . . Key_ID_SN), the processor introduces two ISA invalidation instructions: INVD_Multiple_KeyIDs_1 with the mask technique; and, INVD_Multiple_KeyIDs_2 with the list looking-up technique.

In an exemplary embodiment, the microcode (ucode) of the processor has designs corresponding to these ISA invalidation instructions WBINVD_Single_KeyID, WBINVD_Multiple_KeyIDs, INVD_Single_KeyID, and INVD_Multiple_KeyIDs. Each ISA invalidation instruction may correspond to a section of microcode. In some exemplary embodiments, the processor has hardware accelerators for these ISA invalidation instructions WBINVD_Single_KeyID, WBINVD_Multiple_KeyIDs, INVD_Single_KeyID, and INVD_Multiple_KeyIDs.

Figure 2A:
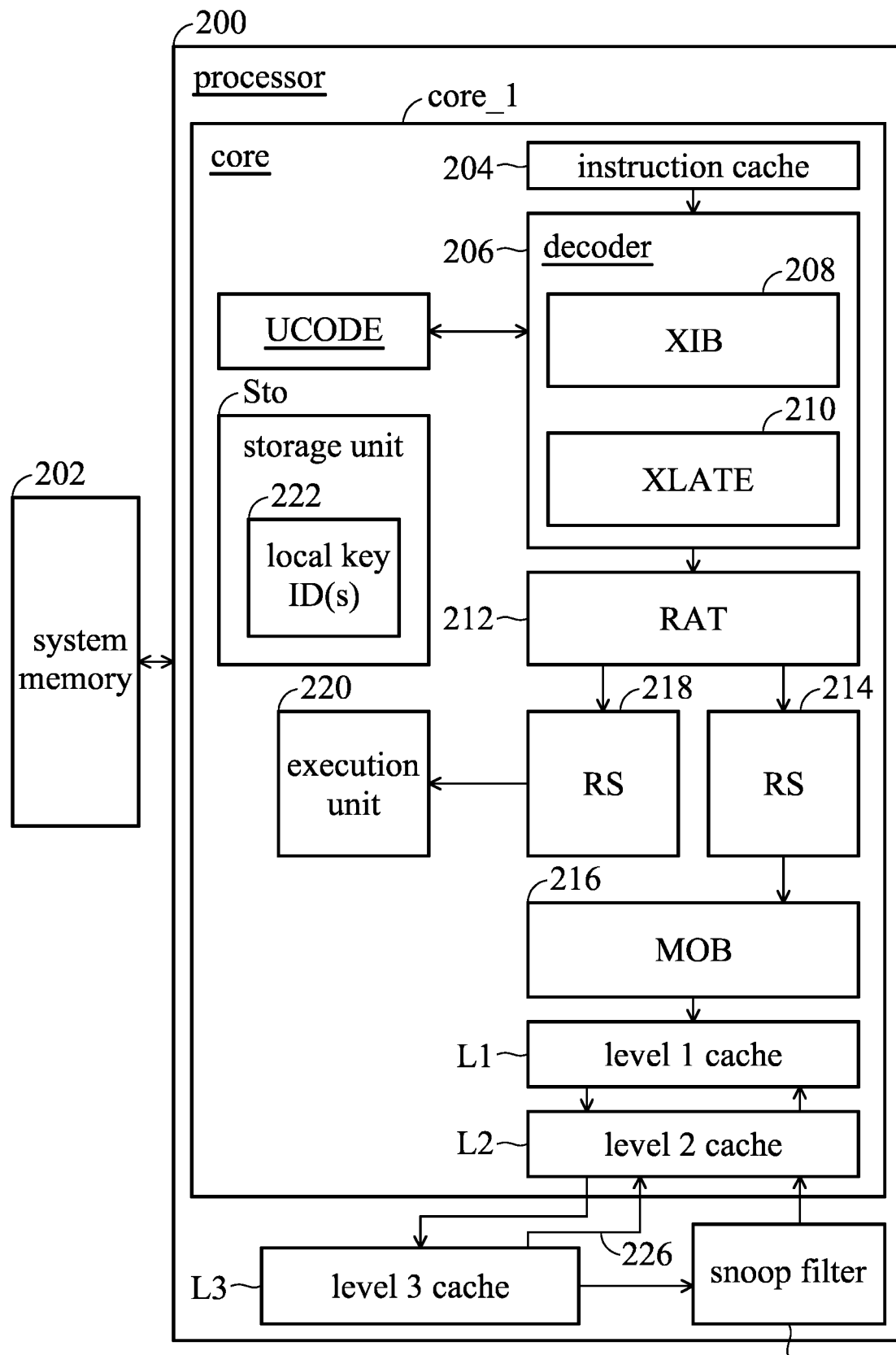
FIG. 2A is a block diagram illustrating a processor 200 that has a core core_1 in accordance with an exemplary embodiment of the present application.
Figure 2B:
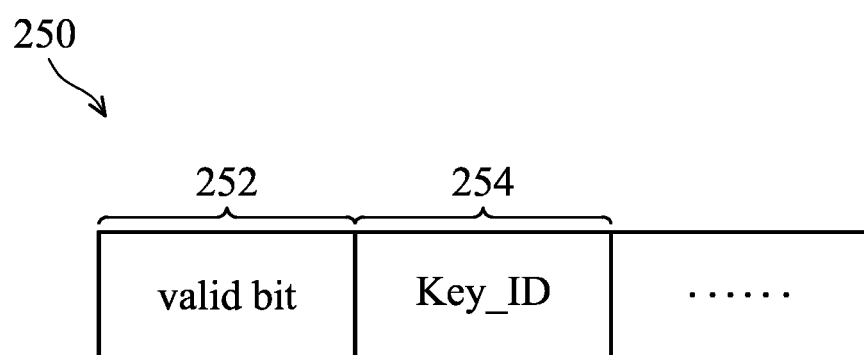
FIG. 2B illustrates a cache line format 250 of a hierarchical cache structure in accordance with an exemplary embodiment of the present application.

FIG. 2A is a block diagram illustrating a processor 200 that has a core core_1 in accordance with an exemplary embodiment of the present application. The illustrated hierarchical cache structure includes level 1, 2, and 3 caches L1, L2 and L3. The level 1 and 2 caches L1 and L2 form an in-core cache module of the core core_1. The level 3 cache L3 is the last level cache (LLC for short) that may be shared with other cores. In another multi-core processor design, the in-core cache module may only include the level 1 cache L1, while the level 2 cache L2 is outside any cores to be shared by multiple cores. The examples will be described later.

As shown in FIG. 2A, a section of instructions is loaded into an instruction cache 204 from a system memory 202 and then decoded by a decoder 206. The decoder 206 includes an instruction buffer (XIB for short) 208 and an instruction translator (XLATE for short) 210. The XIB 208 identifies an ISA invalidation instruction (e.g., a write-back and invalidation instruction WBINVD_Single_KeyID/WBINVD_Multiple_KeyIDs, or a direct invalidation instruction INVD_Single_KeyID/INVD_Multiple_KeyIDs) proposed in the present application. The XLATE 210 translates the ISA invalidation instruction into at least one microinstruction that may be recognized by the pipeline hardware to drive the hardware. Based on the designated key ID(s) indicated by the ISA invalidation instructions, invalidation (with or without writing back the matched and modified cache lines to the system memory 202) is performed on the level 1, 2, and 3 caches L1, L2 and L3. The invalidation (with or without writing back) may be performed according to a single designated key ID (Key_ID_S), or a plurality of designated key IDs (Key_ID_S1 . . . Key_ID_SN). In an exemplary embodiment, the XLATE 210 translates the ISA invalidation instruction into the at least one microinstruction, recognizable by the pipelined hardware, based on the microcode UCODE stored in a microcode memory.

According to a register alias table (RAT) 212, the microinstruction(s) output from the decoder 206 is stored in the reservation stations (RSs) for further utilization. The microinstructions include an invalidation microinstruction (e.g., a write-back and invalidation microinstruction indicating one single designated key ID, a write-back and invalidation microinstruction indicating multiple designated key IDs, a direct invalidation microinstruction indicating one single designated key ID, or a direct invalidation microinstruction indicating multiple designated key IDs). According to the invalidation microinstruction stored in the RS 214, a memory ordering buffer (MOB) 216 is triggered to inform the level 1, 2, and 3 caches L1, L2 and L3 to invalidate (with or without writing back) the matched cache line(s) (matching one single designated key ID, Key_ID_S, or, matching a plurality of designated key IDs Key_ID_S1-Key_ID_SN). In some exemplary embodiments, the execution unit 220 is triggered by some microinstructions stored in the RS 218, to pre-store the single designated key ID (Key_ID_S) or the designated key IDs (Key_ID_S1 . . . Key_ID_SN) into a storage unit Sto as local key IDs 222. The storage unit Sto may be a static random access memory, a dynamic random access memory or a register. The local key IDs 222 may be read later. In an exemplary embodiment, the decoded microinstructions further include microinstructions for exception checking (e.g., privilege level checking), memory address jumping (e.g., jumping to the instruction following the ISA invalidation instruction), and so on. The storage unit Sto is not limited to the internal memory of the core core_1 as shown in the figure. In a multi-core design, the local key IDs 222 may be stored in a storage device shared by multiple cores; for example, the storage device shared by multiple cores may be placed in the uncore area of the processor. In another exemplary embodiment, the local key IDs 222 may be stored in a storage space within any of the level 1, 2, and 3 caches L1, L2 and L3. An invalidation request transferred from the MOB 216 to the level 1 cache L1 may carry one of the local key IDs 222. The level 1 cache L1 stores the received key ID in its internal storage space, and then sends the invalidation request (carrying the key ID) to the level 2 cache L2. The level 2 cache L2 stores the received key ID in its internal storage space, and then sends the invalidation request (carrying the key ID) to the level 3 cache L3. The level 3 cache L3 stores the received key ID in its internal storage space. In an exemplary embodiment, before programming the designated key ID Key_ID_S (or the designated key IDs Key_ID_S1~Key_ID_SN) into the storage unit Sto, the execution unit 220 cleans the old local key IDs from the storage unit Sto.

The following describes how the hardware shown in FIG. 2A operates in response to the four ISA invalidation instructions WBINVD_Single_KeyID, WBINVD_Multiple_KeyIDs, INVD_Single_KeyID, and INVD_Multiple_KeyIDs of the present application. In the code, there is at least one setting instruction (e.g., a MOV instruction) prior to an ISA invalidation instruction of the present application, for preparation of the operands used in the ISA invalidation instruction. The ISA invalidation instruction is executed based on the information set by the setting instruction.

The ISA invalidation instruction WBINVD_Single_KeyID is discussed first, which performs write-back and invalidation in a hierarchical cache structure based on one single designated key ID (Key_ID_S).

Referring to the FIG. 2A, a single designated key ID (Key_ID_S) obtained from a register, a system memory 202, or an immediate value, may be carried in a write-back and invalidation request to be transferred to the level 1 cache L1 through the communication interface between the MOB 216 and the level 1 cache L1. The write-back and invalidation request carrying the single designated key identifier (Key_ID_S) is transferred from the level 1 cache L1 to the level 2 cache L2 and then to the level 3 cache L3. According to the single designated key identifier (Key_ID_S) obtained from the received write-back and invalidate request, the level 3 cache L3 searches itself to determine which cache lines within the level 3 cache L3 match the designated key identifier (Key_ID_S). If a matched cache line in the level 3 cache L3 has been modified ("M" state) and does not exist in any upper-level cache (L1/L2), the level 3 cache L3 writes back the matched cache line to the system memory 202. Note that whether modified or not, all matched cache lines within the level 3 cache L3 are invalidated (by deasserting a valid bit of a matched cache line). In the following paragraph, how to determine the matched cache lines (matching the designated key ID Key_ID_S) in the hierarchical cache structure (e.g., including L1, and L2 and L3) is discussed based on FIG. 2B.

The level 3 cache L3 may record the tags of its all matched cache lines (hereinafter referred to as matched cache line tags). Generally, in a hierarchical cache structure, each cache line is assigned a tag for identification. At the different cache levels, the cache lines mapped to the same physical address (PA) of the system memory use the same tag. It means that the cached contents from the same physical address (PA) of the system memory may use an identical tag in the different cache levels in the hierarchical cache structure. Therefore, the tags of the matched cache lines (matched tags) found in the level 3 cache L3 may be used in the determination of the matched cache lines in the L2 and L1. The determination of the matched cache lines in L2 and L1 no longer needs to refer to the designated key ID (Key_ID_S), but instead referring to the matched tags found by the level 3 cache L3. In an exemplary embodiment, a matched tag includes a key identification code (Key_ID), a tag (TAG), an index (INDEX), and the like. In another embodiment, a matched tag includes a physical address (PA).

When there are multiple cache lines match the designated key ID (Key_ID_S) in the level 3 cache L3, the level 3 cache L3 may record multiple matched tags. Corresponding to the multiple matched tags, the level 3 cache L3 sends multiple snoop requests to a snoop filter 224, wherein each snoop request carries one matched tag. The snoop requests are further transferred from the snoop filter 224 to the level 2 cache L2 and then to the level 1 cache L1.

In response to each snoop request from the level 3 cache L3, the level 2 cache L2 searches itself to find a cache line (if any in L2) that has the matched tag obtained from the snoop request. If a found cache line has been modified (M state) and does not exist in the upper-level cache (L1), the level 2 cache L2 writes it back to the system memory 202 and then invalidates the found cache line (for example, deasserting a valid bit of the found cache line to show the invalid state). As for a found cache line which is not modified (in the non-M state), invalidation of this cache line is directly performed without the write-back procedure. In response to each snoop request received from the level 2 cache L2, the level 1 cache L1 searches itself to find a cache line (if any in L1) that has the matched tag obtained from the snoop request. If a found cache line has been modified (M state), the level 1 cache L1 writes it back to the system memory 202 and invalidates the found cache line (for example, deasserting a valid bit of the found cache line to show the invalid state). As for a found cache line which is not modified (in the non-M state), invalidation of this cache line is directly performed without the write-back procedure.

Based on a write-back and invalidation request (carrying a designated key ID Key_ID_S and transferred from L1 to L2 and then to L3) and the snoop requests (carrying the different matched tags and transferred from the L3 to L2 and then to L1), the cache lines in the hierarchical cache structure (L1, L2, and L3) with the matched tags are written back to the system memory 202 (if have been modified and do not have a copy in the upper-level caches), and are all invalidated in the hierarchical cache structure (L1, L2, and L3). The ISA invalidation instruction WBINVD_Single_KeyID completes.

In another exemplary embodiment, a write-back and invalidation request that the memory ordering buffer (MOB) 216 provides to the hierarchical cache structure (L1, L2, and L3) do not carry the designated key ID (Key_ID_S). According to the microinstructions in the RS 218, the execution unit 220 stores the designated key ID (Key_ID_S) in the storage unit Sto as a local key ID 222. When receiving the write-back and invalidation request, the level 3 cache L3 reads the storage unit Sto to get the local key ID 222 as the designated key ID (Key_ID_S). According to the designated key ID (Key_ID_S) read from the storage unit Sto, the level 3 cache L3 performs write back and invalidation on the matched cache lines in L3 and provides snoop requests, through snoop filter 224, to the in-core cache module to write back and invalidate the matched cache lines in the in-core cache module. Then, the ISA invalidation instruction WBINVD_Single_KeyID completes. In an exemplary embodiment, the level 3 cache L3 may read the storage unit Sto to obtain the local key ID by an interrupt procedure. For example, the level 3 cache L3 may send an interrupt signal to the core core_1 and, accordingly, the core core_1 executes an interrupt processing program to write the local key ID 222, obtained from the storage unit Sto, into a register owned by the level 3 cache L3. In another exemplary embodiment, the level 3 cache L3 may directly read the local key ID from the storage unit Sto without using the interrupt procedure.

FIG. 2B illustrates a cache line format 250 of a hierarchical cache structure in accordance with an exemplary embodiment of the present application. In the format 250, the field 252 is a valid bit (VALID), wherein "0" means that the cache line is invalid, and "1" means that the cache line is valid. To invalidate the cache line, the valid bit (VALID) of the cache line is set to 0. A key ID (Key_ID) is recorded in the field 254. When the hierarchical cache structure is searched for the cache lines matching the designated key ID (Key_ID_S), the valid bit (VALID) and the key ID (Key_ID) of each cache line are checked. The valid cache lines with a key ID the same as the designated key ID (Key_ID_S) are regarded as the matched cache lines.

Another ISA invalidation instruction WBINVD_Multiple_KeyIDs is discussed below, which is designed for write-back and invalidation in a hierarchical cache structure based on multiple designated key IDs (Key_ID_S1 . . . Key_ID_SN).

Referring to FIGS. 1B and 2A, based on the dual operands 114 and 116 of the ISA invalidation instruction WBINVD_Multiple_KeyIDs, information is read from the registers or the system memory 202 and, accordingly, the execution unit 220 determines (by a mask technique, or by a list look-up technique, with the details in the forgoing paragraphs) what the designated key IDs (Key_ID_S1 . . . Key_ID_SN) are, and stores the designated key IDs (Key_ID_S1 . . . Key_ID_SN) in the storage unit Sto as the local key IDs 222. Different from the ISA invalidation instruction WBINVD_Single_KeyID which is transformed into a just one write-back and invalidation request that indicates one single designated key ID (Key_ID_S), the ISA invalidation instruction WBINVD_Multiple_KeyIDs is transformed into several write-back and invalidation requests, to separately correspond to the different local key IDs 222 (i.e., the different designated key IDs Key_ID_S1 . . . Key_ID_SN). In an exemplary embodiment, the current write-back and invalidation operation in the hierarchical cache structure (L1, L2, and L3) has to be finished before the MOB 216 provides the next write-back and invalidation request to L3 through L1 and L2. Each time only one write-back and invalidation request is processed.

In an exemplary embodiment, each write-back and invalidation request is generated based on one of the local key IDs 222 read from the storage unit Sto, to carry one of the designated key IDs (Key_ID_S1 . . . Key_ID_SN). According to a designated key ID (Key_ID_S #) carried on one write-back and invalidation request, the level 3 cache L3 performs actions such as the write-back and invalidation of the matched cache lines within L3, and may provide a snoop request to the in-core cache module for the write-back and invalidation the matched cache lines within the in-core cache module (referring to the forgoing descriptions). After the write-back and invalidation requests based on the designated key IDs (Key_ID_S1 . . . Key_ID_SN) are completed one by one, the modified cache lines matching the designated key IDs (Key_ID_S1 . . . Key_ID_SN) in the hierarchical cache structure (L1, L2, and L3) are written back to the system memory 202 and, whether modified or not, all matched cache lines in the hierarchical cache structure (L1, L2, and L3) are invalidated. The ISA invalidation instruction WBINVD_Multiple_KeyIDs is completed.

In another exemplary embodiment, the designated key IDs Key_ID_S1 . . . Key_ID_SN) are not transferred from the memory ordering buffer (MOB) 216 to the hierarchical cache structure (L1, L2, and L3) with the write-back and invalidation requests. A write-back and invalidation request without the designated key ID (Key_ID_S #) is transferred from the level 1 cache L1 to the level 2 cache L2 and finally to the level 3 cache (L3). In response to the received write-back and invalidation request, the level 3 cache L3 reads the storage unit Sto to get one of the local key IDs 222 as the current designated key ID (Key_ID_S #) and, accordingly, the following operations are performed. The matched cache lines within L3 which have been modified and do not exist in the upper-level caches are written back to the system memory 202 and invalidated, and a snoop request is provided to write back and invalidate the matched cache lines in the in-core cache module (referring to the forgoing descriptions). Through the write-back and invalidation requests, the level 3 cache L3 repeatedly accesses the storage unit Sto to get the designated key IDs (Key_ID_S1 . . . Key_ID_SN) from the local key IDs 222 one by one. The modified cache lines matching the designated key IDs (Key_ID_S1 . . . Key_ID_SN) in the hierarchical cache structure L1, L2, and L3 are written back to the system memory 202 and, whether modified or not, all matched cache lines in the hierarchical cache structure L1, L2, and L3 are invalidated. The ISA invalidation instruction WBINVD_Multiple_KeyIDs is completed.

The ISA invalidation instruction INVD_Single_KeyID is discussed below, by which all cache lines in the hierarchical cache structure matching a single designated key ID (Key_ID_S) are invalidated without being written back to the system memory 202.

Referring to FIGS. 1C, 2A, and 2B, a single designated key ID (Key_ID_S) read from a register or the system memory 202, or interpreted from an immediate value may be carried on a direct invalidation request, to be transferred to the level 1 cache L1 through the communication interface between the memory ordering buffer (MOB) 216 and level 1 cache L1. The direct invalidation request with the single designated key ID (Key_ID_S) may be transferred from the level 1 cache L1 to the level 2 cache L2, and finally to the level 3 cache L3. In response to the received direct invalidation request, the level 3 cache L3 invalidates the cache lines matching the designated key ID (Key_ID_S) in the level 3 cache L3 without writing them back to the system memory 202 (no need to consider the cache consistency). The invalidation may be performed by deasserting the valid bit 252 (shown in FIG. 2B) of each matched cache line.

Similar to the aforementioned technique, the level 3 cache L3 records the tags of the matched cache lines in L3 (the matched tags). The matched tags are separately transferred to the snoop filter 224 along with the different snoop requests, and then are further transferred to the level 2 cache L2 and finally to the level 1 cache L1.

In response to each received snoop request, the level 2 cache L2 performs a self-search for a cache line (if any) that has the matched tag carried on the snoop request, and invalidates the matched cache line without writing it back to the system memory 202 (no need to consider the cache consistency). The invalidation may be performed by deasserting the valid bit 252 (shown in FIG. 2B) of the matched cache line. In response to each snoop request transferred from the level 2 cache L2, the level 1 cache L1 performs a self-search for a cache line (if any) that has the matched tag carried on the snoop request, and invalidates the matched cache line without writing it back to the system memory 202 (no need to consider the cache consistency). The invalidation may be performed by deasserting the valid bit 252 (shown in FIG. 2B) of the matched cache line.

In response to a direct invalidation request (without the write-back demand) carrying a designated key ID (Key_ID_S) transferred from L1 to L2 and finally to L3, at least one snoop request is returned from L3 to L2 and finally to L1 if there is at least one matched cache line in the L1, L2 and L3. In response to the at least one snoop request, the at least one cache line matching the designated key ID (Key_ID_S) in the hierarchical cache structure L1, L2, and L3 is all invalidated without being written back to the system memory 202. The ISA invalidation instruction INVD_Single_KeyID is completed.

In another exemplary embodiment, the direct invalidation request that is transferred from the memory ordering buffer (MOB) 216 to the hierarchical cache structure (L1, L2, and L3) does not carry the designated key ID (Key_ID_S). According to the microinstructions in the RS 218, the execution unit 220 stores the designated key ID (Key_ID_S) in the storage unit Sto as a local key ID 222. In response to the received direct invalidation request, the level 3 cache L3 reads the local key ID 222 from the storage unit Sto as the designated key ID (Key_ID_S). Then, the cache lines matching the designated key ID (Key_ID_S) in the level 3 cache L3 are all invalidated without the write-back procedure. The level 3 cache L3 further uses a series of snoop requests to invalidate the matched cache lines within the in-core cache module without the write-back procedure (referring to the forgoing descriptions). The ISA invalidation instruction INVD_Single_KeyID is completed.

The ISA invalidation instruction INVD_Multiple_KeyIDs is discussed below, by which all cache lines in the hierarchical cache structure matching a plurality of designated key IDs (Key_ID_S1 . . . Key_ID_SN) are invalidated without being written back to the system memory 202.

Referring to FIGS. 1D, 2A, and 2B, based on the dual operands 144 and 146 of the ISA invalidation instruction WBINVD_Multiple_KeyIDs, information is read from the registers or the system memory 202 and, accordingly, the execution unit 220 determines (by a mask technique, or by a list look-up technique, with the details in the forgoing paragraphs) the designated key IDs (Key_ID_S1 . . . Key_ID_SN) and stores the designated key IDs (Key_ID_S1 . . . Key_ID_SN) in the storage unit Sto as the local key IDs 222.

In an exemplary embodiment, through the MOB 216, a plurality of direct invalidation requests (without the write-back procedure) corresponding to the different designated key IDs (Key_ID_S1 . . . Key_ID_SN) are provided to the level 1 cache L1, and then transferred from the level 1 cache L1 to the level 2 cache L2, and finally transferred from the level 2 cache L2 to the level 3 cache L3. Each direct invalidation request is generated based on one of the local key IDs 222 read from the storage unit Sto, to carry one of the designated key IDs (Key_ID_S1 . . . Key_ID_SN). According to the designated key ID (Key_ID_S #) carried on the received direct invalidation request, the level 3 cache L3 performs the subsequent operations. The cache lines matching the designated key ID (Key_ID_S #) in the level 3 cache L3 are all invalidated without being written back to the system memory 202. The level 3 cache L3 further uses a series of snoop requests to invalidate the matched cache lines in the in-core cache module without the write-back procedure (referring to the forgoing descriptions). After the direct invalidation requests about the designated key IDs (Key_ID_S1 . . . Key_ID_SN) are completed, the cache lines matching the designated key IDs (Key_ID_S1 . . . Key_ID_SN) in the hierarchical cache structure (L1, L2 and L3) are all invalidated without performing the write-back procedure. The ISA invalidation instruction INVD_Multiple_KeyIDs is completed.

In another exemplary embodiment, the all direct invalidation requests transferred from the memory ordering buffer (MOB) 216 to the hierarchical cache structure (L1, L2, and L3) do not carry any of the designated key IDs (Key_ID_S1 . . . Key_ID_SN). Each direct invalidation request (without indicating any designated key ID) is transferred from the level 1 cache L1 to the level 2 cache L2, and finally to the level 3 cache L3. In response to the received direct invalidation request, the level 3 cache L3 reads the storage unit Sto to get one designated key ID (Key_ID_S #) from the local key IDs 222, and performs the following operations. The cache lines matching the designated key ID (Key_ID_S #) in the level 3 cache L3 are all invalidated without the write-back procedure. The level 3 cache L3 further uses snoop requests to invalidate the matched cache lines within the in-core cache module without the write-back procedure (referring to the forgoing descriptions). In response to the direct invalidation requests, the level 3 cache L3 reads the storage unit Sto several times to get the local key IDs 222 as the designated key IDs (Key_ID_S1 ... Key_ID_SN). In the hierarchical cache structure (L1, L2, and L3), the cache lines matching the designated key IDs (Key_ID_S1 ... Key_ID_SN) are all invalidated without the write-back procedure. The ISA invalidation instruction INVD_Single_KeyID is completed.

In addition to the aforementioned snoop filter 224, the present application further implement the invalidation (with or without the write-back procedure) in another manner. Referring to FIG. 2A, the in-core cache module (L1 and L2) may keep the received invalidation request (a write-back and invalidation request, or a direct invalidation request) in its internal register, and pause to wait for a synchronization signal (sync). The invalidation request (a write-back and invalidation request, or a direct invalidation request) is transferred to the last-level cache (L3) through the in-core cache module (L1 and L2). In response to the invalidation request, the last-level cache (L3) invalidates its matched cache lines (with or without the write-back procedure), and then notifies the in-core cache module (L1 and L2) via a path 226. The level 2 cache L2 waiting for the synchronization signal, therefore, invalidates its matched cache lines (with or without the write-back procedure) according to the invalidation request previously stored in its internal register, and then notifies the level 1 cache L1 waiting for the synchronization signal to invalidates its matched cache lines (with or without the write-back procedure) according to the invalidation request previously stored in the internal register of L1. The invalidation request (with or without the write-back demand) transferred through the hierarchical cache structure (from L1 to L2 and then to L3) may carry or not carry the designated key ID (Key_ID_S #). In an exemplary embodiment, the level 3 cache L3 sends a bit "1" to notify the level 2 cache L2, and the level 2 cache L2 sends a bit "1" to notify the level 1 cache L1. No snoop filter is required to transmit the 1-bit notification from L3 to L2, or from L2 to L1.

The present application further proposes another manner to perform cache line invalidation on the in-core cache module (e.g., including L1 and L2), which does not use the forgoing snoop filter 224, either. Referring to FIG. 2A, in response to the received invalidation request (with or without the write-back demand), an in-core cache module (L1 and L2) starts to invalidate its matched cache lines (with or without the write-back procedure) immediately, and passes the invalidation request to the lower level cache. At the end of the request transfer, the last level cache (L3) is triggered by the request to invalidate its matched cache lines (with or without the write-back procedure), too. The invalidation request (with or without the write-back demand) transferred through the hierarchical cache structure (from L1 to L2 and then to L3) may carry or not carry the designated key ID (Key_ID_S #). In this exemplary embodiment, the in-core cache module (L1 and L2) do not wait for a synchronization signal, and may perform the matched cache line invalidation (with or without the write-back procedure) in parallel with the last level cache (L3), so the system efficiency is higher.

The following describes multi-core computing systems.

Figure 3:
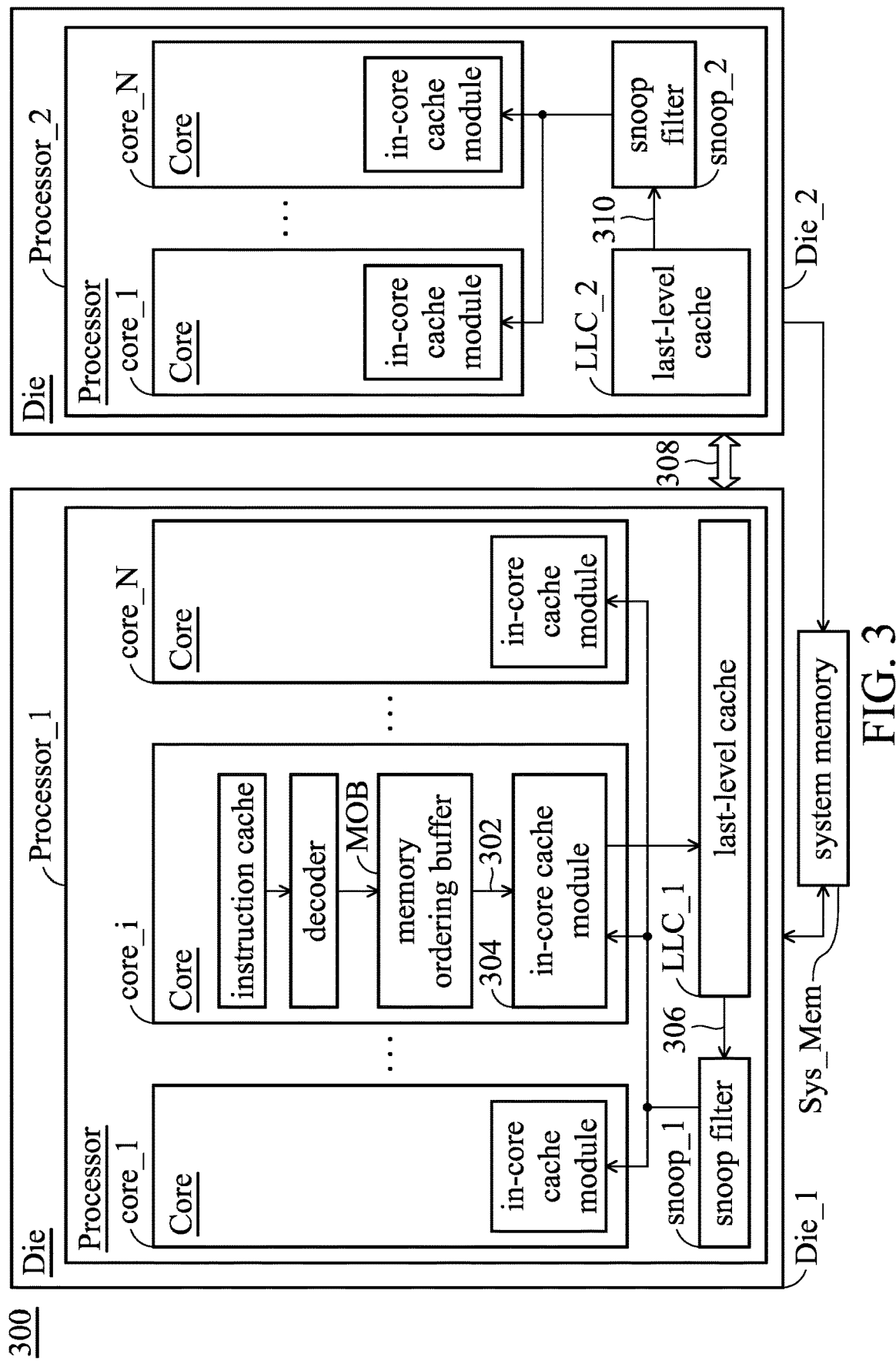
FIG. 3 illustrates a computing system 300 in accordance with an exemplary embodiment of the present application, which includes snoop filters.

FIG. 3 illustrates a computing system 300 in accordance with an exemplary embodiment of the present application, which includes snoop filters. The two dies Die_1 and Die_2 include processors Processor_1 and Proessor_2, respectively. Each processor Processor_1/Proessor_2 includes a plurality of cores core_1~core_N. Each core includes an in-core cache module (e.g., including a level 1 cache L1 and a level 2 cache L2). In the processor Processor_1, the cores core_1~core_N share one last-level cache (e.g., a level 3 cache L3) LLC_1, and a snoop filter Snoop_1 corresponding to the last-level cache LLC_1 is provided. In the processor Processor_2, the cores core_1~core_N share one last-level cache (e.g., a level 3 cache L3) LLC_2, and a snoop filter Snoop_2 corresponding to the last-level cache LLC_2 is provided. The processor Processor_1 on the die Die_1 and the processor Processor_2 on the die Die_2 both are connected to a system memory Sys_Mem. FIG. 3 shows that the core core_i of Processor_1 on Die_1 executes any of the instructions WBINVD_Single_KeyID, WBINVD_Multiple_KeyIDs, INVD_Single_KeyID, or INVD_Multiple_KeyIDs of the present application to perform the invalidation with/without a write-back procedure on the matched cache lines in the hierarchical cache structure.

Within the core core_i, through a communication interface provided by a memory ordering buffer MOB, an invalidation request (with or without the write-back demand) 302 is transferred to the in-core cache module 304. The invalidation request is further transferred from the in-core cache module 304 to the last level cache LLC_1. In response to the received invalidation request, the last level cache LLC_1 searches itself for the cache lines matching a designated key ID (Key_ID_S #). Regarding a write-back and invalidation request, the matched cache lines in the last-level cache LLC_1 with the "M" state and nonexistent in the upper-level caches are written back to the system memory Sys_Mem. Then, all matched cache lines, whether modified or not, in the last-level cache LLC_1 are invalidated. Regarding a direct invalidation request, the matched cache lines in the last-level cache LLC_1 are invalidated without being written back to the system memory Sys_Mem. There may be multiple matched cache lines in the last-level cache LLC_1. The tags of the different matched cache lines may be separately carried on the different snoop requests. The snoop requests are transferred to the snoop filter snoop_1 to be further transferred to the in-core cache modules of the cores core_1-core_N of the processor Processor_1. In response to the received snoop requests, all matched cache lines in the in-core cache modules of the cores core_1-core_N of the processor Processor_1 are invalidated (with or without the write-back procedure). In this manner, in the processor Processor_1, the cache lines matching the designated key ID (Key_ID_S #) in the in-core cache modules of all cores core_1-core_N as well as the matched cache lines in the last-level cache LLC_1 shared by all cores core_1-core_N are indeed invalidated (with or without the write-back procedure).

Specially, through a channel 308 between the die Die_1 and the die Die_2, the last level cache LLC_1 provides the invalidation request received from the in-core cache 304 to the last level cache LLC_2. In response to the received invalidation request, the last level cache LLC_2 searches itself for the cache lines matching a designated key ID (Key_ID_S #). Regarding a write-back and invalidation request, the matched cache lines in the last-level cache LLC_2 with the "M" state and nonexistent in the upper-level caches are written back to the system memory Sys_Mem, and then all matched cache lines, whether modified or not, in the last-level cache LLC_2 are invalidated. Regarding a direct invalidation request, all matched cache lines in the last-level cache LLC_2 are invalidated without being written back to the system memory Sys_Mem. There may be multiple matched cache lines in the last-level cache LLC_2. The tags of the multiple matched cache line may be carried on different snoop requests. The snoop requests are transferred to the snoop filter snoop_2 to be further transferred to the in-core cache modules of the cores core_1-core_N of the processor Processor_2. In response to the received snoop requests, all matched cache lines in the in-core cache modules of the cores core_1-core_N of the processor Processor_2 are invalidated (with or without the write-back procedure). In this manner, in the processor Processor_2, the cache lines matching the designated key ID (Key_ID_S #) in the in-core cache modules of all cores core_1-core_N as well as the matched cache lines in the last-level cache LLC_2 shared by all cores core_1-core_N are indeed invalidated (with or without the write-back procedure).

Similar to the forgoing examples, the invalidation request 302 may carry a designated key ID (Key_ID_S #) or not. When the invalidation request 302 does not carry a designated key ID (Key_ID_S #), the designated key ID (Key_ID_S #) has to be stored in a storage unit as a local key ID, to be accessed by any point in the hierarchical cache structure. In the core core_i of the processor Processor_1, the invalidation request (with or no without the write-back demand) 302 is transferred to the in-core cache 304. If the invalidation request 302 does not carry the designated key ID (Key_ID_S #), the core core_i of the processor Processor_1 transmits the designated key ID (Key_ID_S #) to the processor Processor_2 through the channel 308 between the die Die_1 and the die Die_2. The processor Processor_2 may store the received designated key ID (Key_ID_S #) in any in-core storage unit or in an uncore storage unit.

Figure 4A:
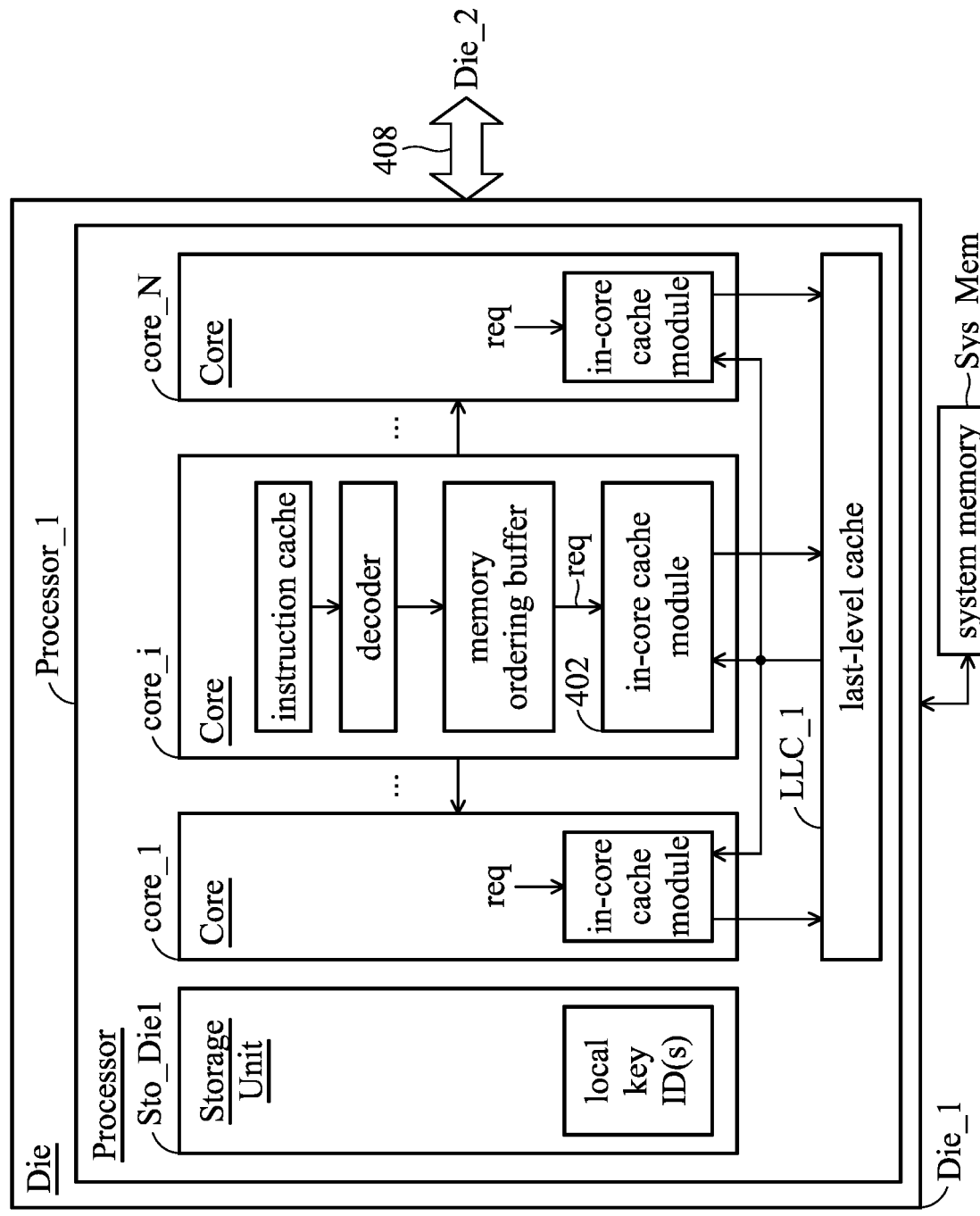
FIGS. 4A and 4B illustrate a computing system 400 in accordance with another exemplary embodiment of the present application, which is a multi-core and multi-die design without snoop filters.
Figure 4B:
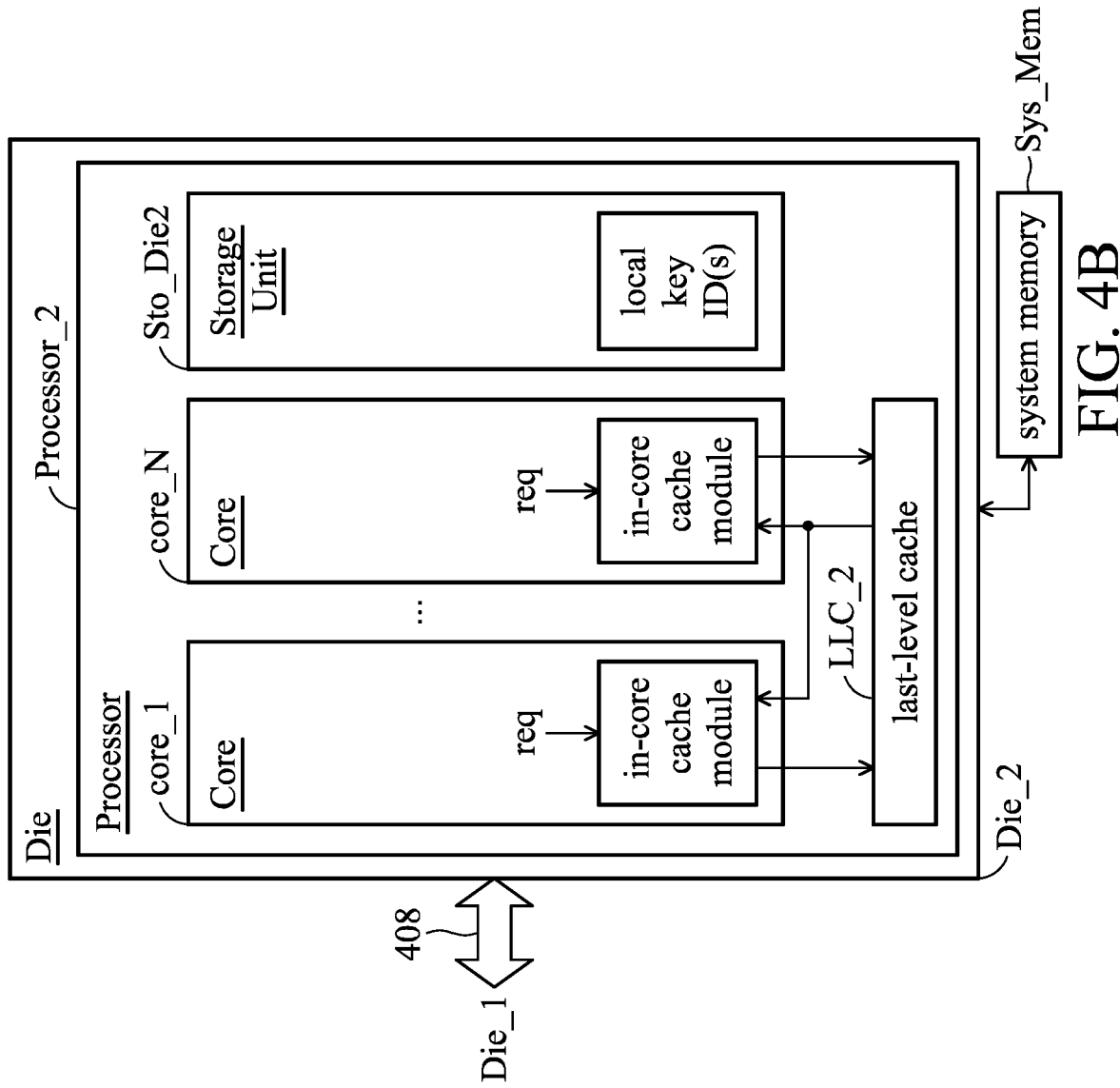

FIGS. 4A and 4B illustrate a computing system 400 in accordance with another exemplary embodiment of the present application, which is a multi-core and multi-die design without snoop filters.

Referring to the core core_i, through a memory ordering buffer MOB, an invalidation request (with or without the write-back demand) req is transferred to the in-core cache module 402 (e.g., including L1 and L2). The invalidation request req is further transferred from the in-core cache module 402 to the last level cache LLC_1 and then the in-core cache module 402 enters a waiting state to wait for a synchronization signal (sync). Based on an interrupt design (referring to the discussion of FIG. 6), the core core_i may further provides the invalidation request req to the other cores (to having the all cores in the processors Processor_1 and Processor_2 to process the same invalidation request req). The other cores also pass the invalidation request req to their in-core cache modules. Every in-core cache module passes the received invalidation request req to its corresponding last level cache (LLC_1 or LLC_2) and then enters the waiting state to wait for a synchronization signal (sync). In this manner, all in-core cache modules in the computing system 400 receive the same invalidation request req and enter the waiting state together to wait for a synchronization signal (sync).

In the processor Processor_1, the in-core cache modules of the different cores each transmit an invalidation request req to the last-level cache LLC_1. The last-level cache LLC_1 responds to the earliest received invalidation request req. The last-level cache LLC_1 searches itself to get the cache lines matching the designated key ID (Key_ID_S #). The designated key ID (Key_ID_S #) may be retrieved from the invalidation request req, or may be read from the local key IDs stored in a storage unit Sto_Die1 that is shared by the different cores of the processor Processor_1. The storage unit Sto_Die1 may be placed in the uncore area of the processor Processor_1. In an exemplary embodiment, before the core core_i provides the invalidation request req to its in-core cache module, the core core_i updates the storage unit Sto_Die1 (shared by the different cores of the processor Processor_1) to store the currently required local key IDs. In another exemplary embodiment, the local key IDs are prepared in each core (core_1 . . . core_N) of the processor Processor_1. The last level cache LLC_1 reads the local key IDs from the core whose invalidation request req is the earliest one received by the last level cache LLC_1, and thereby the designated key ID (Key_ID_S #) is obtained. Regarding a write-back and invalidation request, the matched cache lines in the last-level cache LLC_1 with the "M" state and nonexistent in the upper-level caches are written back to the system memory Sys_Mem, and then all matched cache lines in the last-level cache LLC_1, whether modified or not, are invalidated. Regarding a direct invalidation request, all matched cache lines in the last-level cache LLC_1 are invalidated without being written back to the system memory Sys_Mem. When the invalidation request req is completed on the last-level cache LLC_1, the last-level cache LLC_1 notifies the in-core cache modules of all cores core_1 . . . core_N of the processor Processor_1 for synchronization. In response to the synchronization, each in-core level 2 cache L2 executes its awaited invalidation request req, so that the cache lines matching the designated key ID (Key_ID_S #) in each level 2 cache L2 are invalidated (with or without the write-back procedure). The designated key ID (Key_ID_S #) may be retrieved from the awaited invalidation request req, or may be read from the local key IDs stored in the storage unit Sto_Die1, or may be one of the local key IDs prepared in the core that contains the level 2 cache L2. When the invalidation request req is completed on a level 2 cache L2, the level 2 cache L2 notifies its upper-level cache L1 for synchronization. In response to the synchronization, the level 1 cache L1 executes its awaited invalidation request req, so that the cache lines matching the designated key ID (Key_ID_S #) in the level 1 cache L1 are invalidated (with or without the write-back procedure). The designated key ID (Key_ID_S #) may be retrieved from the awaited invalidation request req, or may be read from the local key IDs stored in the storage unit Sto_Die1, or may be one of the local key IDs prepared in the core that contains the level 1 cache L1.

Referring to the processor Processor_2, the in-core cache module of each core transmits an invalidation request req (provided from the processor Processor_1) to the last-level cache LLC_2. The last-level cache LLC_2 responds to the earliest received invalidation request req. The last-level cache LLC_2 searches itself to get the cache lines matching the designated key ID (Key_ID_S #). The designated key ID (Key_ID_S #) may be retrieved from the received invalidation request req, or may be read from the local key IDs stored in a storage unit Sto_Die2 that is shared by the different cores of the processor Processor_2, or may be read from the local key IDs stored in the core that provides the earliest received invalidation request req. In an exemplary embodiment, before the core core_i provides the invalidation request req to its in-core cache module, the core core_i calls an interruption procedure (referring to the discussion of FIG. 6) to store local key IDs in a master core of the processor Processor_2. The master core updates the storage unit Sto_Die2 (shared by the different cores of the processor Processor_2) to store the current local key IDs. When the invalidation request req is completed on the last-level cache LLC_2, the last-level cache LLC_2 notifies the in-core cache modules of the all cores core_1 . . . core_N of the processor Processor_2 for synchronization. In response to the synchronization, each in-core level 2 cache L2 within the processor Processor_2 is released from the waiting state and executes its awaited invalidation request req. The level 2 cache L2 with the finished invalidation request further notifies its upper level cache L1 for synchronization. In response to the synchronization, the level 1 cache L1 is released from the waiting state and executes its awaited invalidation request req. All matched cache lines in the whole hierarchical cache structure of the processor Processor_2 are successfully invalidated (with or without the write-back procedure) in response to the invalidation request issued by the core core_i of the processor Processor_1.

Specifically, in the exemplary embodiment shown in FIGS. 4A and 4B, when the core core_i of the computing system 400 operates for an invalidation request req (with/without a write-back procedure), the core core_i provides the invalidation request req to the other cores (the other core core_1~core_i-1 and core_i+1~core_N of the processor Processor_1 of the die Die_1 as well as all cores core_1~core_N of the processor Processor_2) prior to transmit the write-back and invalidation request req to the in-core cache module 402. In this manner, all cores in the computing system 400 receive the invalidation request req and act synchronously in response to the invalidation request req. It means that all cores in the computing system 400 provide the invalidation request req to their in-core cache modules at the same time. In an exemplary embodiment, all in-core cache modules start cache line invalidation immediately when receiving the invalidation request req. In another exemplary embodiment, the in-core cache modules provide their received invalidation requests req to the last level cache at the same time, and then all enter a waiting state to wait for a synchronization signal (sync).

In a design that does not use snoop filters in the hierarchical cache structure, for a cache line in an "M" state (modified), the modified cache line at the top level has to be written back to the system memory. In an example, if the level 1 cache L1 and the level 2 cache L2 of a core core_i, and the level 3 cache L3 all have a modified ("M" state) cache line cacheline1, the core core_i needs to write back the cache line cacheline1 from the level 1 cache L1 to the system memory. In another example, if the level 2 cache L2 of a core core_i and the level 3 cache L3 both have the modified ("M" state) cache line cacheline1 but the level 1 cache L1 of the core core_i does not have the cache line cacheline1, the core core_i needs to write back the cache line cacheline1 from the level 2 cache L2 to the system memory.

In another exemplary embodiment, once receiving an invalidation request (with/without a write-back demand), an in-core cache module (including L1 and L2) of a core of the computing system 400 of FIGS. 4A and 4B starts the invalidation of its matched cache lines (with/without a write-back procedure) and passes the received invalidation request (with/without a write-back demand) to the last-level cache (L3). In response to the received invalidation request, the last-level cache (L3) performs the invalidation of its matched cache lines (with/without a write-back procedure). In this exemplary embodiment, the in-core cache module (including L1 and L2) does not need to enter a waiting state to wait for a synchronization signal. Instead, the in-core cache module (including L1 and L2) and the last-level cache (L3) may perform the invalidation of their matched cache lines (with/without a write-back procedure) at the same time. The computer efficiency is higher.

Figure 5:
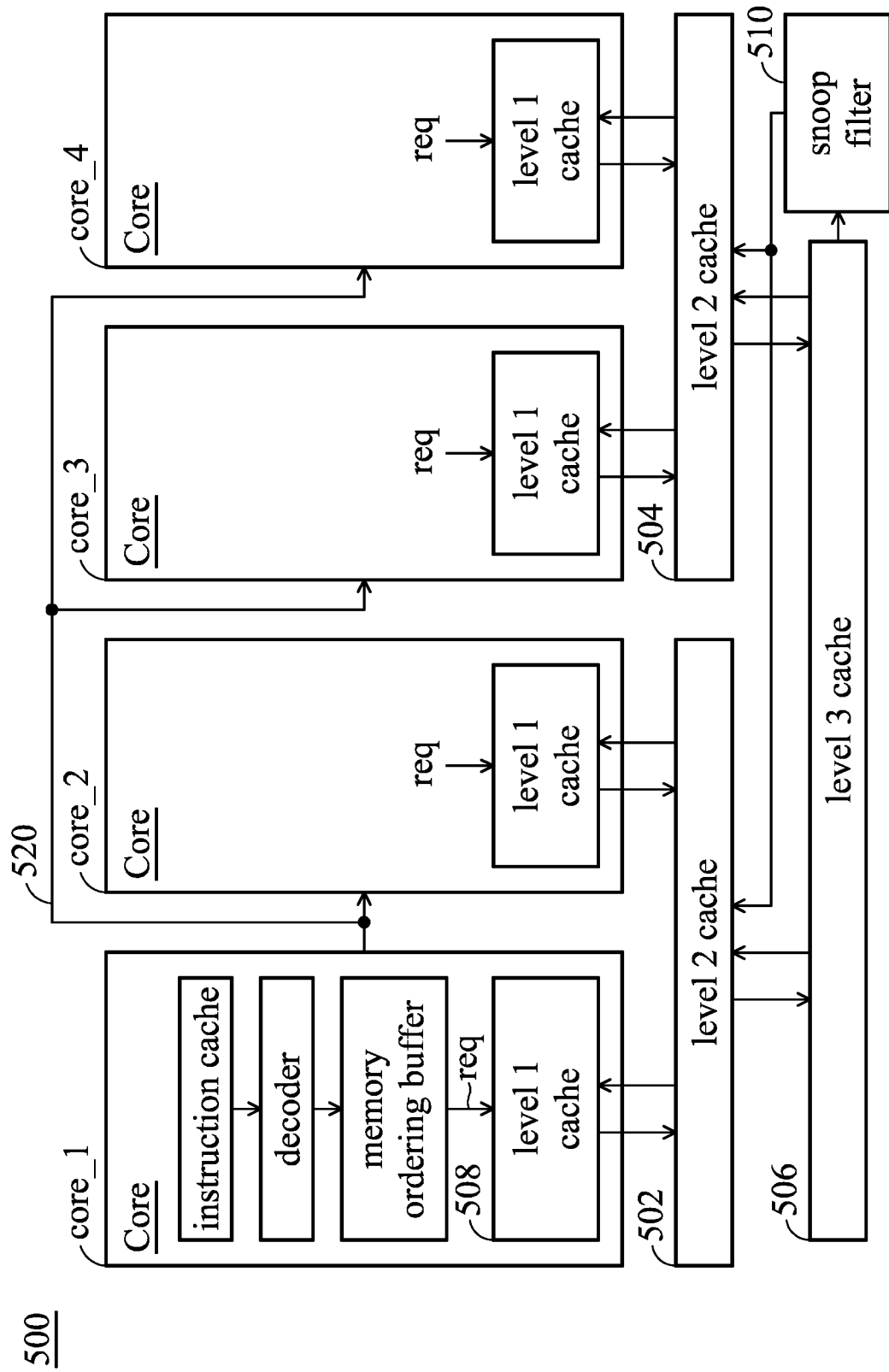
FIG. 5 illustrates a processor 500 in accordance with another exemplary embodiment of the present application, wherein an in-core cache module includes only a level 1 cache L1, and multiple cores share one level 2 cache L2.

FIG. 5 illustrates a processor 500 in accordance with another exemplary embodiment of the present application, wherein an in-core cache module includes only a level 1 cache L1, and multiple cores share one level 2 cache L2.

In the processor 500, the cores core_1 and core_2 share a level 2 cache (L2) 502, and the cores core_3 and core_4 share another level 2 cache (L2) 504. The four cores core_1 . . . core_4 share one single level 3 cache (L3) 506. The core core_1 that initiates an invalidation instruction introduced in the present application provides an invalidation request req to a level 1 cache (L1) 508. The level 1 cache (L1) 508 transmits the invalidation request req to the level 2 cache (L2) 502. The level 2 cache (L2) 502 transmits the invalidation request req to the level 3 cache (L3) 506.

According to the received invalidation request req, the level 3 cache (L3) 506 searches itself for the cache lines matching the designated key ID (Key_ID_S #), and invalidates the matched cache lines (with/without a write-back procedure). The designated key ID (Key_ID_S #) may be retrieved from the received invalidation request req, or may be read from the local IDs prepared in a storage unit that is shared by the cores core_1 . . . core_4, or may be read from the local IDs prepared in each core. In an exemplary embodiment, the shared storage unit may locate in the uncore area of the processor 500. When the invalidation on the matched cache lines on the level 3 cache (L3) 506 is completed, the level 3 cache (L3) 506 outputs a series of snoop requests (with the tags of the different matched cache line tags) to a snoop filter 510 to be further passed to the level 2 caches (L2) 502 and 504, and then further be passed to the level 1 caches (L1) within the cores core_1 to core_4 by the level 2 caches (L2) 502 and 504. In response to each received snoop request, the level 2 cache (L2) 502/504 invalidates (with/without the write-back procedure) a cache line (if any) matching the tag carried on the received snoop request. In response to each received snoop request, a level 1 cache L1 in one of the cores core_1 to core_4 invalidates (with/without the write-back procedure) a cache line (if any) matching the tag carried on the received snoop request. In this manner, cache line management of a designated key ID in the hierarchical cache structure is completed.

In another exemplary embodiment, the snoop filter 510 is not used. When the core core_1 that initiates an invalidation instruction introduced in the present application provides an invalidation request req (with or without the write-back procedure) to the level 1 cache (L1) 508, the core core_1 further provides the same invalidation requests req to the other cores core_2 to core_4 through the inter-core channels 520 shown in FIG. 5 or through an interrupt design provided in the present application (referring to the discussion of FIG. 6). The other cores core_2 to core_4 provides the received invalidation request req to their level 1 caches (L1). Thus, the level 1 caches (L1) of all cores core_1 . . . core_4 of the processor 500 receive the same invalidation requests (req). Each level 1 cache (L1) transmits the received invalidation request (req) to the lower level cache (L2) and enters a waiting state to wait for a synchronization signal (sync).

The level 2 cache (L2) 502 receives the invalidation request (req) from the level 1 cache L1 of core core_1 as well as the level 1 cache L1 of core core_2. According to the earliest received invalidation request (req), the level 2 cache 502 passes the invalidation request (req) to the level 3 cache (L3) 506 and enters a waiting state to wait for a synchronization signal (sync). The level 2 cache (L2) 504 receives the invalidation request (req) from the level 1 cache L1 of core core_3 as well as the level 1 cache L1 of core core_4. According to the earliest received invalidation request (req), the level 2 cache 504 passes the invalidation request (req) to the level 3 cache (L3) 506 and enters a waiting state to wait for a synchronization signal (sync).

According to the earliest received invalidation request req, the level 3 cache (L3) 506 searches itself for the cache lines matching the designated key ID (Key_ID_S #), and invalidates (with/without the write-back procedure) the matched cache lines. The designated key ID (Key_ID_S #) may be retrieved from the received invalidation request req, or may be a local key ID prepared in a storage unit that is shared by the different cores core_1 . . . core_4, or may be a local key ID prepared in the cores core_1 . . . core_4. When completing processing the invalidation request req, the level 3 cache (L3) 506 notifies the level 2 caches (L2) 502 and 504 and, accordingly, the level 2 caches (L2) 502 and 504 to awake from their waiting state. In response the awaited invalidation request req, the level 2 caches (L2) 502 and 504 invalidate (with/without the write-back procedure) their cache lines which match the designated key ID (Key_ID_S #). The designated key ID (Key_ID_S #) used in the invalidation of the level 2 caches (L2) 502 and 504 may be retrieved from the awaited invalidation request req, or may be a local key ID prepared in a storage unit that is shared by the different cores core_1 . . . core_4, or may be a local key ID prepared in the cores core_1 . . . core_4. When completing the invalidation requests req, the level 2 cache (L2) 502 notifies the level 1 caches (L1) of the cores core_1 and core_2. When completing the invalidation requests req, the level 2 cache (L2) 504 notifies the level 1 caches (L1) of the cores core_3 and core_4. Each notified level 1 cache L1 awakes from its waiting state. In response the awaited invalidation request req, each level 1 cache L1 invalidates (with/without the write-back procedure) its cache lines which match the designated key ID (Key_ID_S #). The designated key ID (Key_ID_S #) used in the invalidation of a level 1 cache L1 may be retrieved from the awaited invalidation request req, or may be a local key ID prepared in a storage unit that is shared by the different cores core_1 . . . core_4, or may be a local key ID prepared in the core of the level 1 cache L1.

For two processors (each the same as the processor 500) separately fabricated on two dies, when any processor initiates an invalidation instruction of the present application to manage the hierarchical cache structure in accordance with the designated key ID(s), through an inter-die channel between the two dies, all cores in another processor have the same invalidation requests and provide the invalidation requests to their level 1 caches (L1). In this manner, all cache lines in the hierarchical cache structure formed on the multiple dies are managed uniformly.

In another exemplary embodiment that does not use the snoop filter 510, when receiving an invalidation request (with/without the write-back demand), the in-core cache module (including L1) of each core in the processor 500 of FIG. 5 invalidates (with/without the write-back procedure) its matched cache lines and provides the invalidation request (with/without the write-back demand) to the level 2 cache L2 and then to the last-level cache (L3). In response to the received invalidation request, the level 2 cache L2 and the last-level cache (L3) invalidates (with/without the write-back procedure) their matched cache lines immediately. In this example, the in-core cache module (L1) and the level 2 caches (L2) do not need to enter a waiting state to wait for synchronization. The other level caches in the hierarchical cache structure may invalid their matched cache lines at the same time, so the system efficiency is improved.

An interrupt design is shown in the present application. When one core in the multi-core architecture initiates an invalidation instruction of the present application, the other cores in the multi-core architecture are triggered through the interrupt design.

Figure 6:
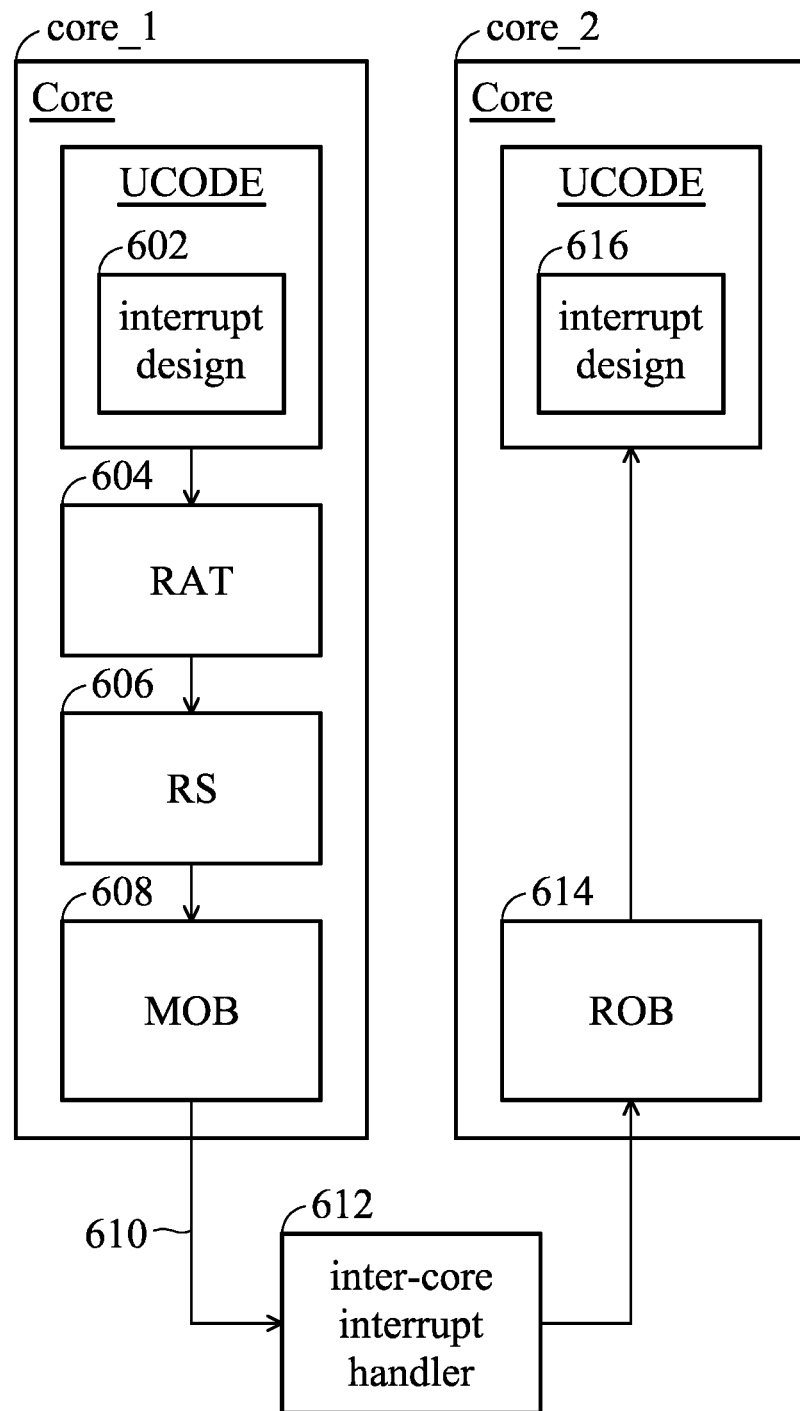
FIG. 6 illustrates a multi-core computing system 600 in accordance with an exemplary embodiment of the present application.

FIG. 6 illustrates a multi-core computing system 600 in accordance with an exemplary embodiment of the present application. As shown in FIG. 6, the microcode UCODE (which may be the same as the UCODE in FIG. 2A) includes the microinstruction(s) of the interrupt design (referring to 602). The core core_1 initiates an invalidation instruction of the present application, which is decoded by the decoder (referring to the decoder 206 shown in FIG. 2) and then transformed into the microinstruction(s) 602. Through a register alias table (RAT) 604 and a reservation station (RS) 606, the decoded microinstruction(s) 602 are passed to an execution unit (not shown in FIG. 6) and a memory ordering buffer (MOB) 608 for execution. By executing the microinstruction(s) 602 of the interrupt design, the execution units (not shown) sends an interrupt request 610 to an inter-core interrupt handler 612 through the memory ordering buffer (MOB) 608. The message carried on the interrupt request 610 may indicate the target core (e.g., the core core_2), and the reason for the interruption (e.g., in response to a request for invalidation with/without a write-back procedure). Prior to the invalidation request 610, the execution unit (e.g., an ALU, not shown) may execute microinstructions to generate the message carried on the invalidation request 610. The inter-core interrupt handler 612 analyzes the interrupt request 610, and then interrupts the target core core_2 according to an interrupt vector number and an interrupt demand (e.g., in response to an invalidation request, req, with or without a write-back procedure). After the currently-executed ISA instruction in the core core_2 is retired, based on the information stored in a re-order buffer (ROB) 614, the core core_2 executes the microinstructions in the interrupt design 616 which are read from the microcode UCODE according to the interrupt vector number. In an exemplary embodiment, the invalidation demand (req) is cached into the in-core cache module of the core core_2. In an exemplary embodiment, a reserved or undefined number of the interrupt vector list may be used as the interrupt vector number of the present application. The interrupt design may be implemented by coding the microcode 602 and 616.

In another exemplary embodiment, the interrupt demand (req) is stored in a storage space in the core core_2. The core core_2 may check the storage space regularly (for example, using a polling mechanism to check the storage space every fixed time interval), so that the invalidation request req is also sent to the in-core cache module of the core core_2.

Any computing system (using a single-core processor, a multi-core processor, or multiple processors) that executes a single ISA instruction to manage its hierarchical cache structure according to designated key ID(s) (e.g., invalidation of matched cache lines with/without a write-back procedure) is considered within the claim scope of this case.

According to the technology of the present application, the hierarchical cache structure is managed in granularity of keys. When the system memory is encrypted according to total memory encryption technology, the operating system can manage the cache lines in the hierarchical cache structure in granularity of keys.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computing system with write-back and invalidation in a hierarchical cache structure based on one single designated key identification code, comprising:
   a first core provided by a first processor that is fabricated on a first die, including
      a decoder, a memory ordering buffer, and a first in-core cache module; and
   a first last-level cache, fabricated in the first processor; wherein:
   in response to a first instruction of an instruction set architecture that is provided for write-back and invalidation in a hierarchical cache structure based on one single designated key identification code, the decoder outputs at least one microinstruction;
   based on the at least one microinstruction, a write-back and invalidation request is provided to the first in-core cache module through the memory ordering buffer, and then passed to the first last-level cache by the first in-core cache module; and
   in response to the write-back and invalidation request, the first last-level cache searches itself to determine which cache lines within the first last-level cache match the designated key identification code, wherein: if a matched cache line has been modified and does not exist in any upper-level cache, the first last-level cache writes back the matched cache line to a system memory; and, whether modified or not, all matched cache lines within the first last-level cache are invalidated.

2. The computing system as claimed in claim 1, wherein: a cache line is invalidated by de-asserting a valid bit of the cache line.

3. The computing system as claimed in claim 1, wherein: the write-back and invalidation request carries the designated key identification code; and
   the first last-level cache searches itself according to the designated key identification code carried on the write-back and invalidation request to determine which cache lines within the first last-level cache match the designated key identification code.

4. The computing system as claimed in claim 1, further comprising:
   a first storage unit, storing the designated key identification code indicated by the first instruction;
   wherein:
   the write-back and invalidation request does not carry the designated key identification code;
   in response to the write-back and invalidation request, the first last-level cache obtains the designated key identification code from the first storage unit, and searches itself according to the designated key identification code obtained from the first storage unit to determine which cache lines within the first last-level cache match the designated key identification code.

5. The computing system as claimed in claim 4, wherein: the first storage unit is designed in the first core for calculations of the first core, or is placed in an uncore area of the first processor to be shared by a plurality of cores of the first processor.

6. The computing system as claimed in claim 1, wherein:
   the first processor further includes a first snoop filter;
   corresponding to each matched cache line in the first last-level cache, the first last-level cache provides one snoop request to be passed to the first in-core cache module through the first snoop filter;
   each snoop request carries a tag to represent the corresponding matched cache line, and the tag further tags associated cached contents in the other levels of the hierarchical cache structure;
   in response to each snoop request, the first in-core cache module searches itself to determine which cache lines within the first in-core cache module match the tag carried on the snoop request, wherein: if a matched cache line has been modified, the first in-core cache module writes back the matched cache line to the system memory; and, whether modified or not, all matched cache lines within the first in-core cache module are invalidated.

7. The computing system as claimed in claim 6, wherein:
   the first in-core cache module includes a level 1 cache and a level 2 cache;
   the first last-level cache is a level 3 cache;
   the write-back and invalidation request is transferred from the level 1 cache to the level 2 cache, and then passed to the level 3 cache by the level 2 cache;
   each snoop request from the first snoop filter is received by the level 2 cache, and then passed to the level 1 cache by the level 2 cache;
   in response to each snoop request, the level 2 cache searches itself to determine which cache lines within the level 2 cache match the tag carried on the snoop request, wherein: if a matched cache line has been modified and does not exist in the level 1 cache, the level 2 cache writes back the matched cache line to the system memory; and, whether modified or not, all matched cache lines within the level 2 cache are invalidated; and
   in response to each snoop request, the level 1 cache searches itself to determine which cache lines within the level 1 cache match the tag carried on the snoop request, wherein: if a matched cache line has been modified, the level 1 cache writes back the matched cache line to the system memory; and, whether modified or not, all matched cache lines within the level 1 cache are invalidated.

8. The computing system as claimed in claim 6, wherein:
   the first processor further includes a second core, and the second core includes a second in-core cache module;
   each snoop request is further transferred to the second in-core cache module through the first snoop filter;
   in response to each snoop request, the second in-core cache module searches itself to determine which cache lines within the second in-core cache module match the tag carried on the snoop request, wherein: if a matched cache line has been modified, the second in-core cache module writes back the matched cache line to the system memory; and, whether modified or not, all matched cache lines within the second in-core cache module are invalidated.

9. The computing system as claimed in claim 8, wherein:
   the first core and the second core each include one level 1 cache to implement the first in-core cache module and the second in-core cache module;

the first processor includes a level 2 cache which is shared by the first core and the second core;

the first last-level cache is a level 3 cache;

the write-back and invalidation request is transferred from the level 1 cache of the first core to the level 2 cache shared by the first core and the second core, and then passed to the level 3 cache by the level 2 cache;

each snoop request from the first snoop filter is received by the level 2 cache shared by the first core and the second core, and then passed to the level 1 cache of the first core and the level 1 cache of the second core by the level 2 cache;

in response to each snoop request, the level 2 cache searches itself to determine which cache lines within the level 2 cache match the tag carried on the snoop request, wherein: if a matched cache line has been modified and does not exist in any upper-level cache, the level 2 cache writes back the matched cache line to the system memory; and, whether modified or not, all matched cache lines within the level 2 cache are invalidated;

in response to each snoop request, the level 1 cache of the first core searches itself to determine which cache lines within the level 1 cache of the first core match the tag carried on the snoop request, wherein: if a matched cache line has been modified, the level 1 cache of the first core writes back the matched cache line to the system memory; and, whether modified or not, all matched cache lines within the level 1 cache of the first core are invalidated; and in response to each snoop request, the level 1 cache of the second core searches itself to determine which cache lines within the level 1 cache of the second core match the tag carried on the snoop request, wherein: if a matched cache line has been modified, the level 1 cache of the second core writes back the matched cache line to the system memory; and, whether modified or not, all matched cache lines within the level 1 cache of the second core are invalidated.

10. The computing system as claimed in claim 1, further comprising:
a second processor fabricated on a second die, including a third core and a second last-level cache, wherein the third core includes a third in-core cache module; wherein:

through a channel between the first die and the second die, the first last-level cache further provides the write-back and invalidation request received from the first in-core cache module to the second last-level cache; and in response to the write-back and invalidation request, the second last-level cache searches itself to determine which cache lines within the second last-level cache match the designated key identification code, wherein: if a matched cache line has been modified and does not exist in any upper-level cache, the second last-level cache writes back the matched cache line to the system memory; and, whether modified or not, all matched cache lines within the second last-level cache are invalidated.

11. The computing system as claimed in claim 10, wherein:
the second processor further includes a second snoop filter;

corresponding to each matched cache line in the second last-level cache, the second last-level cache provides one snoop request to be passed to the third in-core cache module through the second snoop filter;

each snoop request carries a tag to represent the corresponding matched cache line, and the tag further tags associated cached contents in the other levels of the hierarchical cache structure; and in response to each snoop request, the third in-core cache module searches itself to determine which cache lines within the third in-core cache module match the tag carried on the snoop request, wherein: if a matched cache line has been modified, the third in-core cache module writes back the matched cache line to the system memory; and, whether modified or not, all matched cache lines within the third in-core cache module are invalidated.

12. The computing system as claimed in claim 1, wherein:
after providing the first last-level cache with the write-back and invalidation request, the first in-core cache module is switched to a waiting state for synchronization;

after all matched cache lines within the first last-level cache are invalidated, the first last-level cache returns a first synchronization signal to the first in-core cache module;

the first in-core cache module in the waiting state is awakened by the first synchronization signal returned from the first last-level cache, to search itself to determine which cache lines within the first in-core cache module match the designated key identification code, wherein: if a matched cache line has been modified, the first in-core cache module writes back the matched cache line to the system memory; and, whether modified or not, all matched cache lines within the first in-core cache module are invalidated.

13. The computing system as claimed in claim 12, wherein:
the first in-core cache module includes a level 1 cache and a level 2 cache;

the first last-level cache is a level 3 cache;

the write-back and invalidation request is transferred from the level 1 cache to the level 2 cache, and then passed to the level 3 cache by the level 2 cache;

the level 3 cache provides the first synchronization signal to the level 2 cache;

in response to the first synchronization signal, the level 2 cache in the waiting state is awakened to search itself to determine which cache lines within the level 2 cache match the designated key identification code, wherein: if a matched cache line has been modified and does not exist in the level 1 cache, the level 2 cache writes back the matched cache line to the system memory; and, whether modified or not, all matched cache lines within the level 2 cache are invalidated;

after all matched cache lines within the level 2 cache are invalidated, the level 2 cache returns a second synchronization signal to the level 1 cache; and in response to the second synchronization signal, the level 1 cache in the waiting state is awakened to search itself to determine which cache lines within the level 1 cache match the designated key identification code, wherein: if a matched cache line has been modified, the level 1 cache writes back the matched cache line to the system memory; and, whether modified or not, all matched cache lines within the level 1 cache are invalidated.

14. The computing system as claimed in claim 12, wherein:
the first processor further includes a second core, and the second core includes a second in-core cache module;

the write-back and invalidation request is further provided to the second core through the memory ordering buffer of the first core, and then passed to the first last-level cache by the second in-core cache module of the second core; and the first last-level cache responds to the earlier write-back and invalidation request received from the first core or the second core.

15. The computing system as claimed in claim 14, further comprising:

an inter-core interrupt handler, receiving an interrupt request that the first core outputs through the memory ordering buffer of the first core in response to the write-back and invalidation request, and operating a re-order buffer of the second core to start an interrupt procedure designed in microcode of the second core, wherein the write-back and invalidation request is provided to the second in-core cache module according to the interrupt procedure.

16. The computing system as claimed in claim 14, wherein:

the first last-level cache further returns the first synchronization signal to the second in-core cache module; and the second in-core cache module in the waiting state is awakened by the first synchronization signal returned from the first last-level cache, to search itself to determine which cache lines within the second in-core cache module match the designated key identification code, wherein: if a matched cache line has been modified, the second in-core cache module writes back the matched cache line to the system memory; and, whether modified or not, all matched cache lines within the second in-core cache module are invalidated.

17. The computing system as claimed in claim 16, wherein:

the first core and the second core each include one level 1 cache to implement the first in-core cache module and the second in-core cache module;

the first processor includes a level 2 cache which is shared by the first core and the second core;

the first last-level cache is a level 3 cache;

the write-back and invalidation request is transferred from the level 1 cache of the first core to the level 2 cache shared by the first core and the second core, and then passed to the level 3 cache by the level 2 cache;

the level 3 cache provides the first synchronization signal to the level 2 cache shared by the first core and the second core;

in response to the first synchronization signal, the level 2 cache in the waiting state is awakened to search itself to determine which cache lines within the level 2 cache match the designated key identification code, wherein: if a matched cache line has been modified and does not exist in any upper-level cache, the level 2 cache writes back the matched cache line to the system memory; and, whether modified or not, all matched cache lines within the level 2 cache are invalidated;

after all matched cache lines within the level 2 cache are invalidated, the level cache returns a second synchronization signal to the level 1 cache of the first core and the level 1 cache of the second core; and in response to the second synchronization signal, the level 1 cache of the first core in the waiting state is awakened to search itself to determine which cache lines within the level 1 cache of the first core match the designated key identification code, wherein: if a matched cache line has been modified, the level 1 cache of the first core writes back the matched cache line to the system memory; and, whether modified or not, all matched cache lines within the level 1 cache of the first core are invalidated; and in response to the second synchronization signal, the level 1 cache of the second core in the waiting state is awakened to search itself to determine which cache lines within the level 1 cache of the second core match the designated key identification code, wherein: if a matched cache line has been modified, the level 1 cache of the second core writes back the matched cache line to the system memory; and, whether modified or not, all matched cache lines within the level 1 cache of the second core are invalidated.

18. The computing system as claimed in claim 12, further comprising:

a second processor fabricated on a second die, including a third core and a second last-level cache, wherein the third core includes a third in-core cache module;

wherein:

the write-back and invalidation request is further provided to the third core through the memory ordering buffer of the first core and a channel between the first die and the second die, and then passed to the second last-level cache through the third in-core cache module of the third core; and in response to the write-back and invalidation request, the second last-level cache searches itself to determine which cache lines within the second last-level cache match the designated key identification code, wherein: if a matched cache line has been modified and does not exist in any upper-level cache, the second last-level cache writes back the matched cache line to the system memory; and, whether modified or not, all matched cache lines within the second last-level cache are invalidated;

after all matched cache lines within the second last-level cache are invalidated, the second last-level cache returns a third synchronization signal to the third in-core cache module; and in response to the third synchronization signal, the third in-core cache module in the waiting state is awakened to search itself to determine which cache lines within the third in-core cache module match the designated key identification code, wherein: if a matched cache line has been modified, the third in-core cache module writes back the matched cache line to the system memory; and, whether modified or not, all matched cache lines within the third in-core cache module are invalidated.

19. The computing system as claimed in claim 1, wherein:

the first instruction uses one single operand to indicate a register, a system memory address, or an immediate value to get the designated key identification code.

20. A computing system with write-back and invalidation in a hierarchical cache structure based on a plurality of designated key identification codes, comprising:

a first core provided within a first processor that is fabricated on a first die, including a decoder, a memory ordering buffer, and a first in-core cache module; and a first last-level cache, fabricated in the first processor;

wherein:

in response to a second instruction of an instruction set architecture that is provided for write-back and invalidation in a hierarchical cache structure based on a plurality of designated key identification codes, the decoder outputs at least one microinstruction;

based on the at least one microinstruction decoded from the second instruction, the designated key identification codes are stored in a storage unit of the first core, and a plurality of write-back and invalidation requests corresponding to the different designated key identification codes read from the storage unit are provided to the first in-core cache module through the memory ordering buffer; and write-back and invalidation in the hierarchical cache structure based on the next designated key identification code is performed after write-back and invalidation in the hierarchical cache structure based on a current designated key identification code is finished.

21. The computing system as claimed in claim 20, wherein:
the second instruction uses dual operands to get an initial key identification code and a mask; and
based on the mask and the initial key identification code, the plurality of designated key identification codes required by the second instruction are generated.

22. The computing system as claimed in claim 20, wherein:
the second instruction uses dual operands to get a system memory address and a designated number of key identification codes;
a starting designated key identification code is stored in a list in a system memory as indicated by the system memory address; and
the list in the system memory is read according to the system memory address and the designated number to provide the plurality of designated key identification codes.

23. A method for write-back and invalidation in a hierarchical cache structure based on one single designated key identification code, comprising:
in response to a first instruction of an instruction set architecture that is fetched by a first core for write-back and invalidation in a hierarchical cache structure based on one single designated key identification code, operating a decoder of the first core to output at least one microinstruction, wherein the first core is provided within a first processor that is fabricated on a first die;
based on the at least one microinstruction, a write-back and invalidation request is provided to a first in-core cache module of the first core through a memory ordering buffer of the first core, and then passed to a first last-level cache by the first in-core cache module, wherein the first last-level cache is fabricated outside of the first core within the first processor; and
in response to the write-back and invalidation request, operating the first last-level cache to search itself to determine which cache lines within the first last-level cache match the designated key identification code, wherein: if a matched cache line has been modified and does not exist in any upper-level cache, the first last-level cache writes back the matched cache line to a system memory; and, whether modified or not, all matched cache lines within the first last-level cache are invalidated.

24. The method as claimed in claim 23, wherein:
the write-back and invalidation request carries the designated key identification code; and
the first last-level cache searches itself according to the designated key identification code carried on the write-back and invalidation request to determine which cache lines within the first last-level cache match the designated key identification code.

25. The method as claimed in claim 23, further comprising:
storing the designated key identification code indicated by the first instruction into a first storage unit;
wherein:
the write-back and invalidation request does not carry the designated key identification code;
in response to the write-back and invalidation request, the first last-level cache obtains the designated key identification code from the first storage unit, and searches itself according to the designated key identification code obtained from the first storage unit to determine which cache lines within the first last-level cache match the designated key identification code.

26. The method as claimed in claim 23, further comprising:
corresponding to each matched cache line in the first last-level cache, operating the first last-level cache to provide one snoop request to be passed to the first in-core cache module through a first snoop filter of the first processor;
wherein:
each snoop request carries a tag to represent the corresponding matched cache line, and the tag further tags associated cached contents in the other levels of the hierarchical cache structure;
in response to each snoop request, the first in-core cache module searches itself to determine which cache lines within the first in-core cache module match the tag carried on the snoop request, wherein: if a matched cache line has been modified, the first in-core cache module writes back the matched cache line to the system memory; and, whether modified or not, all matched cache lines within the first in-core cache module are invalidated.

27. The method as claimed in claim 26, wherein:
the first processor further includes a second core, and the second core includes a second in-core cache module;
each snoop request is further transferred to the second in-core cache module through the first snoop filter;
in response to each snoop request, the second in-core cache module searches itself to determine which cache lines within the second in-core cache module match the tag carried on the snoop request, wherein: if a matched cache line has been modified, the second in-core cache module writes back the matched cache line to the system memory; and, whether modified or not, all matched cache lines within the second in-core cache module are invalidated.

28. The method as claimed in claim 23, further comprising:
through a channel between the first die and a second die, operating the first last-level cache to provide the write-back and invalidation request received from the first in-core cache module to a second last-level cache of a second processor fabricated on the second die, wherein the second processor further includes a third core, and the third core includes a third in-core cache module; and
in response to the write-back and invalidation request, operating the second last-level cache to search itself to determine which cache lines within the second last-level cache match the designated key identification code, wherein: if a matched cache line has been modified and does not exist in any upper-level cache, the second last-level cache writes back the matched cache line to the system memory; and, whether modified or not, all matched cache lines within the second last-level cache are invalidated.

29. The method as claimed in claim 28, wherein:
the second processor further includes a second snoop filter;
corresponding to each matched cache line in the second last-level cache, the second last-level cache provides one snoop request to be passed to the third in-core cache module through the second snoop filter;
each snoop request carries a tag to represent the corresponding matched cache line, and the tag further tags associated cached contents in the other levels of the hierarchical cache structure; and
in response to each snoop request, the third in-core cache module searches itself to determine which cache lines within the third in-core cache module match the tag carried on the snoop request, wherein: if a matched cache line has been modified, the third in-core cache module writes back the matched cache line to the system memory; and, whether modified or not, all matched cache lines within the third in-core cache module are invalidated.

30. The method as claimed in claim 23, wherein:
after providing the first last-level cache with the write-back and invalidation request, the first in-core cache module is switched to a waiting state for synchronization;
after all matched cache lines within the first last-level cache are invalidated, the first last-level cache returns a first synchronization signal to the first in-core cache module;
the first in-core cache module in the waiting state is awakened by the first synchronization signal returned from the first last-level cache, to search itself to determine which cache lines within the first in-core cache module match the designated key identification code, wherein: if a matched cache line has been modified, the first in-core cache module writes back the matched cache line to the system memory; and, whether modified or not, all matched cache lines within the first in-core cache module are invalidated.

31. The method as claimed in claim 30, wherein:
the first processor further includes a second core, and the second core includes a second in-core cache module;
the write-back and invalidation request is further provided to the second core through the memory ordering buffer of the first core, and then passed to the first last-level cache by the second in-core cache module of the second core; and
the first last-level cache responds to the earlier write-back and invalidation request received from the first core or the second core.

32. The method as claimed in claim 31, wherein:
the first last-level cache further returns the first synchronization signal to the second in-core cache module; and
the second in-core cache module in the waiting state is awakened by the first synchronization signal returned from the first last-level cache, to search itself to determine which cache lines within the second in-core cache module match the designated key identification code, wherein: if a matched cache line has been modified, the second in-core cache module writes back the matched cache line to the system memory; and, whether modified or not, all matched cache lines within the second in-core cache module are invalidated.

33. The method as claimed in claim 30, further comprising:
through the memory ordering buffer of the first core and a channel between the first die and a second die, providing the write-back and invalidation request to a third in-core cache module of a third core of a second processor fabricated on the second die;
operating the third in-core cache module to provide the write-back and invalidation request to a second last-level cache within the second processor;
in response to the write-back and invalidation request, operating the second last-level cache to search itself to determine which cache lines within the second last-level cache match the designated key identification code, wherein: if a matched cache line has been modified and does not exist in any upper-level cache, the second last-level cache writes back the matched cache line to the system memory; and, whether modified or not, all matched cache lines within the second last-level cache are invalidated; and
after all matched cache lines within the second last-level cache are invalidated, operating the second last-level cache to return a third synchronization signal to the third in-core cache module, wherein, in response to the third synchronization signal, the third in-core cache module in the waiting state is awakened to search itself to determine which cache lines within the third in-core cache module match the designated key identification code, wherein: if a matched cache line has been modified, the third in-core cache module writes back the matched cache line to the system memory; and, whether modified or not, all matched cache lines within the third in-core cache module are invalidated.

34. A method for write-back and invalidation in a hierarchical cache structure based on a plurality of designated key identification codes, comprising:
in response to a second instruction of an instruction set architecture that is fetched by a first core for write-back and invalidation in a hierarchical cache structure based on a plurality of designated key identification codes, operating a decoder of the first core to output at least one microinstruction, wherein the first core is provided by a first processor that is fabricated on a first die;
based on the at least one microinstruction decoded from the second instruction, storing the designated key identification codes in a storage unit of the first core and, through a memory ordering buffer of the first core, providing a plurality of write-back and invalidation requests, corresponding to the different designated key identification codes read from the storage unit, to a first in-core cache module of the first core,
wherein write-back and invalidation in the hierarchical cache structure based on the next designated key identification code is performed after write-back and invalidation in the hierarchical cache structure based on a current designated key identification code is finished.

35. The method as claimed in claim 34, wherein:
the second instruction uses dual operands to get an initial key identification code and a mask; and
based on the mask and the initial key identification code, the plurality of designated key identification codes required by the second instruction are generated.

36. The method as claimed in claim 34, wherein:
the second instruction uses dual operands to get a system memory address and a designated number of key identification codes;

a starting designated key identification code is stored in a list on a system memory as indicated by the system memory address; and the list on the system memory is read according to the system memory address and the designated number to provide the plurality of designated key identification codes.

* * * * *